(12) United States Patent
Wang et al.

(10) Patent No.: US 11,930,381 B2
(45) Date of Patent: Mar. 12, 2024

(54) BACKUP LINK FOR LOW LATENCY COMMUNICATION

(71) Applicant: Apple Inc., Cupertino, CA (US)

(72) Inventors: Qi Wang, Sunnyvale, CA (US); Yong Liu, Cupertino, CA (US); Jinjing Jiang, San Jose, CA (US); Jarkko L. Kneckt, Los Gatos, CA (US); Lochan Verma, San Diego, CA (US); Tianyu Wu, Cupertino, CA (US); Su Khiong Yong, Palo Alto, CA (US); Guoqing Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/337,748

(22) Filed: Jun. 3, 2021

(65) Prior Publication Data

US 2021/0409979 A1    Dec. 30, 2021

Related U.S. Application Data

(60) Provisional application No. 63/044,474, filed on Jun. 26, 2020.

(51) Int. Cl.
*H04W 24/04* (2009.01)
*H04L 45/24* (2022.01)
(Continued)

(52) U.S. Cl.
CPC .............. *H04W 24/04* (2013.01); *H04L 45/24* (2013.01); *H04W 28/082* (2023.05); *H04W 52/0258* (2013.01)

(58) Field of Classification Search
None
See application file for complete search history.

(56) References Cited

U.S. PATENT DOCUMENTS

2005/0097196 A1*  5/2005  Wronski ............. H04L 43/0817
                                                              709/223
2006/0239271 A1   10/2006  Khasnabish et al.
(Continued)

FOREIGN PATENT DOCUMENTS

CN          101310477      * 11/2008
CN          102984743 A      3/2013
(Continued)

OTHER PUBLICATIONS

Chinese Office Action Search Report directed to related Chinese Application No. 202110690961.X, with English-language translation of the Search Report attached, dated Dec. 15, 2023; 13 pages.
(Continued)

*Primary Examiner* — Andre Tacdiran
(74) *Attorney, Agent, or Firm* — Sterne, Kessler, Goldstein & Fox P.L.L.C.

(57) ABSTRACT

Some aspects of this disclosure include apparatuses and methods for implementing backup link establishment and operation for multi-link wireless communication networks such as a wireless local area network (WLAN). Some aspects relate to an electronic device including a transceiver configured to communicate over a wireless network and a processor communicatively coupled to the transceiver. The processor receives a message including information associated with a backup link from a second electronic device. The processor further receives data associated with data traffic from the second electronic device on a primary link of the wireless network. In response to a quality of the primary link being below a threshold, the processor receives a notification frame from the second electronic device on the backup link and receives additional data associated with the data traffic from the second electronic device on the backup link or on an other link informed by the notification frame.

20 Claims, 14 Drawing Sheets

(51) Int. Cl.
*H04W 28/082* (2023.01)
*H04W 52/02* (2009.01)

(56) References Cited

U.S. PATENT DOCUMENTS

| | | | | |
|---|---|---|---|---|
| 2007/0097940 | A1* | 5/2007 | Yuen | H04W 52/346 370/338 |
| 2009/0061770 | A1* | 3/2009 | Agardh | H04W 52/0225 455/41.2 |
| 2011/0250858 | A1* | 10/2011 | Jain | H04W 16/14 455/120 |
| 2011/0286539 | A1* | 11/2011 | Kawai | H04L 5/06 375/259 |
| 2013/0016606 | A1* | 1/2013 | Cirkovic | H04L 43/10 370/225 |
| 2013/0325305 | A1* | 12/2013 | Foti | G08G 1/164 701/117 |
| 2014/0194075 | A1* | 7/2014 | Black | H04B 1/525 455/73 |
| 2017/0094693 | A1* | 3/2017 | Law | H04W 8/005 |
| 2018/0049017 | A1* | 2/2018 | Shmidt | H04W 4/80 |
| 2018/0054724 | A1* | 2/2018 | Cariou | H04W 8/005 |
| 2018/0184435 | A1* | 6/2018 | Cariou | H04W 52/0203 |
| 2018/0206284 | A1* | 7/2018 | Zhou | H04W 52/0216 |
| 2019/0053325 | A1* | 2/2019 | Yu | H04W 76/15 |
| 2019/0159038 | A1 | 5/2019 | Xu et al. | |
| 2019/0174383 | A1* | 6/2019 | Zhang | H04W 36/08 |
| 2019/0373587 | A1 | 12/2019 | Chang et al. | |
| 2021/0266998 | A1* | 8/2021 | Ho | H04W 48/16 |
| 2021/0352669 | A1* | 11/2021 | Lu | H04W 72/23 |
| 2021/0367881 | A1* | 11/2021 | Bivans | H04L 43/0894 |

FOREIGN PATENT DOCUMENTS

| | | |
|---|---|---|
| CN | 105682131 A | 6/2016 |
| CN | 107659951 A | 2/2018 |
| CN | 109673023 A | 4/2019 |

OTHER PUBLICATIONS

Huawei, HiSilicon, "Introduction of UE power saving mode," 3GPP TSG-CT WG1 Meeting #86, C1-140285, Jan. 14, 2014; 41 pages.
Tan et al., "Deep Reinforcement Learning for Intelligent Communications," with English-language abstract, Mar. 30, 2020; 13 pages.

* cited by examiner

BACKUP LINK FOR LOW LATENCY COMMUNICATION

CROSS-REFERENCE TO RELATED APPLICATIONS

The present application claims the benefit of U.S. Provisional Patent Application No. 63/044,474, filed on Jun. 26, 2020, which is hereby incorporated by reference in its entirety.

BACKGROUND

Field

The described aspects generally relate to channel access in wireless communications. For example, the aspects of this disclosure relate to establishing and using backup link(s) for low latency communication in multi-link wireless communication networks, such as a wireless local area network (WLAN).

Related Art

A first station can communicate data with a second station using a transceiver over a communication link. If the first link becomes unavailable, the first and second stations need to wait for the communication link to become available again before the first and second stations can continue. Additionally, or alternatively, the first and second station need to go long association procedures to reestablish their communication.

SUMMARY

Some aspects of this disclosure include apparatuses and methods for implementing backup link establishment and operation for multi-link wireless communication networks, such as a wireless local area network (WLAN). The backup link establishment and operation for a multi-link WLAN, described in this disclosure can assist devices in the WLAN (e.g., an access point (AP), a station (STA), etc.) to realize one or more benefits, such as faster switching between links, better utilization of channel resources, reduce channel access time upon channel switching, and/or save power and/or time.

Some aspects of this disclosure relate to an electronic device. The electronic device includes a transceiver configured to communicate over a wireless network and a processor communicatively coupled to the transceiver. The processor is configured to receive a message from a second electronic device. The message includes information associated with a backup link of the wireless network. The processor is further configured to receive data associated with data traffic from the second electronic device on a primary link of the wireless network. In response to a quality of the primary link being below a threshold, the processor receives a notification frame from the second electronic device on the backup link and receives additional data associated with the data traffic from the second electronic device on the backup link, or on another, link in response to the notification frame.

In some examples, the processor is further configured to transmit, to the second electronic device, a second message indicating that the electronic device supports the backup link and the backup link is associated with a receiver or a second transceiver of the electronic device.

In some examples, the processor is further configured to transmit, to the second electronic device, a second message indicating an alternative backup link and to receive, from the second electronic device, a third message confirming an updated backup link.

In some examples, the electronic device further includes a second transceiver configured to operate on a frequency associated with the backup link. The transceiver can be configured to operate on a frequency associated with the primary link. In some examples, the processor can be configured to receive the data, on the primary link from the second electronic device, using the transceiver. In some examples, the processor can be configured to receive the additional data, on the backup link from the second electronic device, using the second transceiver.

In some examples, the processor is configured to set a power save schedule of the second transceiver, configured to operate on a frequency of the backup link, based at least on a traffic schedule associated with the data. Alternatively, the processor is configured to set a power save schedule of the second transceiver, configured to operate on a frequency of the backup link, based at least on a power save schedule of the transceiver, configured to operate on a frequency of the primary link.

In some examples, the electronic device further includes a receiver configured to scan channels in the network. The transceiver is configured to operate on a frequency associated with the primary link. In some examples, the processor can be configured to receive the data, on the primary link from the second electronic device, using the transceiver. In some examples, the processor can be configured to receive the notification frame, on the backup link, using the receiver.

In some examples, the electronic device further includes an auxiliary radio configured to operate in a listening mode, the auxiliary radio being capable of receiving simple frames (e.g., a notification frame) on the backup link, and the transceiver is configured to operate on a frequency associated with the primary link. In some examples, the processor can be configured to receive the data on the primary link, from the second electronic device, using the transceiver. the auxiliary receiver-only radio can be in a listening mode prior to the reception on the backup link, from the second electronic device, of the notification frame. After a device implementation-specific delay upon receiving the notification frame, the first electronic device is able to both transmit and receive on the back up link by transitioning radio resources from the transceiver to the auxiliary radio, and therefore backup link becomes the new low latency communication link.

In some examples, the notification frame includes at least one of a notification that the quality of the primary link is below the threshold or information associated with the other link for continued data communication. In some examples, the processor is configured to set a scan schedule of the receiver based at least on a traffic schedule associated with the data. Alternatively, the processor is configured to set a scan schedule of the receiver based at least on a power save schedule of the transceiver that is configured to operate on a frequency of the primary link.

In some examples, the data is associated with an item of low latency traffic. In some examples, the electronic device is a non-access point station and the second electronic device is an access point in the wireless network. In some examples, the electronic device is a non-access point station and the second electronic device is a non-access point station in the wireless network.

Some aspects of the disclosure relate to a method that includes receiving, at a first electronic device, a message from a second electronic device. The message includes information associated with a backup link of a wireless network. The method further includes receiving, at the first electronic device and from the second electronic device, data associated with low latency traffic on a primary link of the wireless network. In response to a quality of the primary link being below a threshold, the method includes receiving additional data associated with the low latency traffic from the second electronic device on the backup link and receiving a notification frame from the second electronic device on the backup link. The notification frame includes at least one of a notification that the quality of the primary link is below the threshold or information associated with a communication link to be used for communicating the additional data.

Some aspects of the disclosure relate to a non-transitory computer-readable medium storing instructions that, when executed by a processor of a first electronic device, cause the processor to perform operations including receiving a message from a second electronic device that includes information associated with a backup link of a wireless network. The operations further include receiving, from the second electronic device, data associated with low latency traffic on a primary link of the wireless network. In response to a quality of the primary link being below a threshold, the operations include receiving a notification frame from the second electronic device on the backup link and receiving additional data associated with the low latency traffic from the second electronic device on the backup link or on another link in response to the notification frame.

Some aspects of the disclosure relate to an electronic device that includes a transceiver configured to communicate over a wireless network and a processor communicatively coupled to the transceiver. The processor is configured to transmit, to a second electronic device, a message that includes information associated with a backup link of the wireless network. The processor further transmits data associated with data traffic to the second electronic device on the primary link of the wireless network. In response to a determination that a quality of the primary link is below a threshold, the processor transmits a notification frame to the second device on the backup link and transmits additional data associated with the data traffic to the second device on the backup link, or on another link, in response to the notification frame.

Some aspects of the disclosure relate to a method that includes transmitting, by a first electronic device, a message to a second electronic device that includes information associated with a backup link of a wireless network. The method further includes transmitting data associated with data traffic to the second electronic device on the primary link of the wireless network. In response to a determination that a quality of the primary link is below a threshold, the method includes transmitting a notification frame to the second device on the backup link and transmitting additional data associated with the data traffic to the second device on the backup link, or on another link, indicated by the notification frame.

Some aspects relate to a non-transitory computer-readable medium storing instructions that, when executed by a processor of a first electronic device, cause the processor to perform operations including transmitting, to a second electronic device, a message that includes information associated with a backup link of a wireless network. The operations further include transmitting data associated with data traffic to the second electronic device on the primary link of the wireless network. In response to a determination that a quality of the primary link is below a threshold, the operations include transmitting a notification frame to the second device on the backup link and transmitting additional data associated with the data traffic to the second device on the backup link or on another link indicated by the notification frame.

This Summary is provided for purposes of illustrating some aspects of the disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1A:
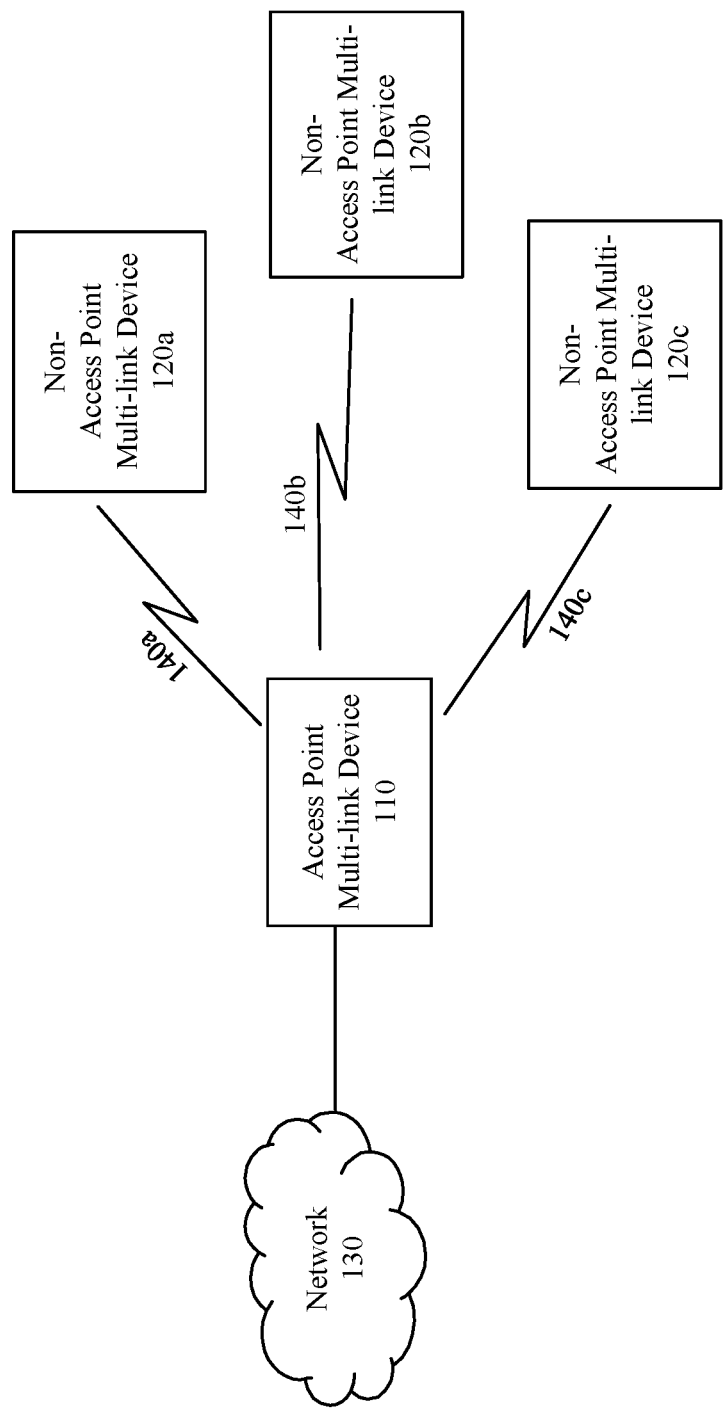
FIG. 1A illustrates an example system implementing backup link establishment and operation in a communication network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing backup link establishment and operation for multi-link wireless communication networks, such as a wireless local area network (WLAN). The backup link establishment and operation for WLAN of the aspects of this disclosure can assist the devices in the WLAN (e.g., an access point (AP), a station (STA)) to faster switch between links to reduce communication latency and have fewer service interruption, to better utilize channel resources, and/or to save power.

According to some aspects of the disclosure, the backup link establishment and operation for WLAN can be implemented with communication techniques compatible with Institute of Electrical and Electronics Engineers (IEEE) 802.11 standards (such as, but not limited to, IEEE 802.11ac, IEEE 802.11ax, IEEE 802.11bc, IEEE 802.11bd, IEEE 802.11be, etc.). However, the aspects of this disclosure can also be applied to operations in other multi-link communication networks operating in accordance with any protocol(s).

FIG. 1A illustrates an example system 100 implementing the backup link establishment and operation in a communication network (such as, but not limited to, a multi-link communication network), according to some aspects of the disclosure. Example system 100 is provided for the purpose of illustration only and does not limit the disclosed aspects. System 100 may include, but is not limited to, access point (AP) multi-link device (MLD) 110, non-AP MLDs 120, and network 130. Non-AP MLDs 120a-120c may include, but are not limited to, Wireless Local Area Network (WLAN) stations such as wireless communication devices, smart phones, laptops, desktops, tablets, personal assistants, monitors, televisions, wearable devices, gaming devices and the like. AP MLD 110 may include but is not limited to WLAN electronic devices such as a wireless router, a wearable device (e.g., a smart watch), a wireless communication device (e.g., a smart phone), a gaming device, or a combination thereof. Network 130 may be the Internet and/or a WLAN. Non-AP MLD 120's communications are shown as wireless communications 140. The communication between AP MLD 110 and non-AP MLD 120 can take place using wireless communications 140a-140c. The wireless communications 140a-140c can be based on a wide variety of wireless communication techniques. These techniques can include, but are not limited to, techniques based on IEEE 802.11 (such as, but not limited to IEEE 802.11ac, IEEE 802.11ax, IEEE 802.11bc, IEEE 802.11bd, IEEE 802.11be, IEEE 802.11v, etc. standards).

According to some aspects, AP MLD 110 and non-AP MLDs 120 are configured to implement a multi-link communication. In other words, AP MLD 110 and non-AP MLDs 120 are configured to implement and support simultaneous or substantially simultaneous data transfer using multiple MAC/PHY links. For example, FIG. 1B illustrates an example multi-link communication between two devices, according to some aspects of the disclosure.

Figure 1B:
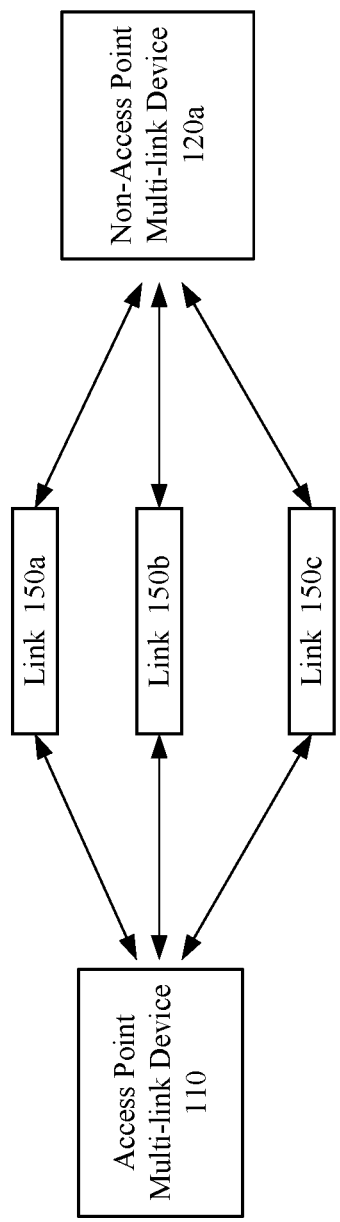
FIG. 1B illustrates an example multi-link communication between two devices, according to some aspects of the disclosure.

As illustrated in FIG. 1B, non-AP MLD 120a and AP MLD 110 can communicate with each other using multiple links 150a-150c. In other words, non-AP MLD 120a and AP MLD 110 can use multiple MAC/PHY links 150a-150c to simultaneously or substantially simultaneously transfer data. Although three links 150 are illustrated, the aspects of this disclosure are not limited to this example and any number of links 150 can be implemented. The links 150 can include different wireless channels, according to some aspects. For example, each wireless channel/link 150 can be defined based on its respective frequency that is different from the others. However, the aspects of this disclosure are not limited to wireless channels and other MAC/PHY layer links can be used as links 150 for communication between non-AP MLD 120a and AP MLD 110.

Also, although links 150a-150c are shown as links between non-AP MLD 120a and AP MLD 110, the aspects of this disclosure are not limited to this example. In some aspects, the multi-link communication can be between two APs (and/or two AP MLDs) and the aspects of this disclosure implementing the backup link establishment and operation can be applied between two APs (and/or two AP MLDs). Additionally or alternatively, the multi-link communication can be between two stations (STAs) (e.g., two STAs of two non-AP MLDs) and the aspects of this disclosure implementing the backup link establishment and operation can be applied to peer-to-peer (P2P) communication. For example, the communication between two STAs (and links 150) can be direct communication (and direct links) between these STAs. Additionally or alternatively, the communication between two STAs (and links 150) is through AP MLD 110. In this example, wireless communications 140a and 140b, as shown in FIG. 1A, can include links 150a-150c of FIG. 1B.

According to some aspects, the backup link establishment and operation can be used for low latency (LL) communication. However, the aspects of this disclosure are not limited to this example, and the backup link establishment and operation of this disclosure can be used for other communications. In some examples, the low latency communication and low latency capabilities of system 100 can be used for gaming applications. Additionally or alternatively, the low latency communication and low latency capabilities of system 100 can be used for interactive video applications. Additionally or alternatively, the low latency communication and low latency capabilities of system 100 can be used for video application(s) providing interactive play, such as but not limited to, virtual reality (VR), augmented reality (AR), and the like. For example, the low latency communication and low latency capabilities of system 100 can be used for video application(s) that include a control loop, where a feedback input exists between, for example, a viewer of the video application and the video content. Additionally, or alternatively, the low latency communication and low latency capabilities of system 100 can be used for other applications where a control loop (e.g., a feedback loop) exists between non-AP MLD 120 and AP MLD 110 (and/or between non-AP MLD 120a and non-AP MLD 120b, and/or between two AP MLDs). Additionally, or alternatively, the low latency communication and low latency capabilities of system 100 can be used in industrial uses. For example, in communications between sensors and an AP MLD, where it is important to meet the low latency requirements. However, the aspects of this disclosure are not limited to these examples of low latency communications and the backup link establishment and operation aspect of this disclosure can be applied to other examples of low latency communications or communication that does not require low latency.

According to some aspects, non-AP MLD 120a and AP MLD 110 can communicate over link 150a, as illustrated in FIG. 1B. Non-AP MLD 120a and AP MLD 110 can use link 150*a* to achieve low latency capabilities. In some examples of this disclosure, and as discussed in more detail below, if the quality of link 150*a* deteriorates, AP MLD 110 and non-AP MLD 120*a* can quickly switch the low latency communication to a different link (e.g., link 150*b*) that has a better quality. According to some aspects, AP MLD 110 can monitor the quality of link 150*a* (and other links). For example, AP MLD 110 can use information AP MLD 110 receives from non-AP MLD 120*a* (and/or other non-AP MLDs) to determine the quality of link 150*a* (and other links). In some examples, the quality of a link (e.g., link 150*a*) can include the amount of interference on the link, the amount of congestion on the link, the latency of the link, the signal to noise ratio of the link, and the like. However, the aspects of this disclosure are not limited to these examples and other metrics can be used to determine the quality of the link (e.g., link 150*a*).

If the quality of link 150*a* deteriorates (e.g., one or more metrics used to determine the quality of the link are below one or more predetermined thresholds), then link 150*a* is no longer suitable for continued data transmission or link quality change notification. In other words, when the quality of link 150*a* deteriorates, AP MLD 110 cannot use link 150*a* for the low latency communication with non-AP MLD 120*a*. Additionally, or alternatively, AP MLD 110 cannot use link 150*a* to communicate to non-AP MLD 120*a* to switch to another and better link (e.g., link 150*b*).

Because an AP MLD typically does not go into power save, and typically has a higher or the same number of transceivers than that of a non-AP MLD, a backup link is established to ensure a non-AP STA's availability to receive a notification from the AP MLD. Even without a backup link agreement, the non-AP typically is able to transmit a notification frame to the AP MLD when needed due to the availability of the AP MLD.

According to some aspects, AP MLD 110 and non-AP MLD 120*a* have established a backup link (e.g., link 150*b*). In these examples, the backup link 150*b* is not used for the low latency communication before the quality of link 150*a* deteriorates. In some examples, when the quality of link 150*a* deteriorates, AP MLD 110 can quickly switch to backup link 150*b* to continue to transmit the data associated with the low latency communication and non-AP MLD 120 can use backup link 150*b* to continue to receive and/or transmit the data. In these examples, backup link 150*b* can be used as the new low latency communication link. Since AP MLD 110 and non-AP MLD 120*a* had established link 150*b* as the backup link, switching the communication from link 150*a* to link 150*b* is fast, the link switch time is reduced, and the channel access time is reduced. Such a link switch initiated by the AP MLD 110 implies quality deterioration of link 150*a* and the link switch. In some examples, AP MLD 110 may also transmit an explicit link quality change and link switch notification frame to non-AP MLD 120*a* to indicate the link switch. In these examples, using the explicit link quality change and link switch notification frame, AP MLD 110 can notify non-AP MLD 120*a* of the link qualification deterioration of the primary low latency link 150*a* and of the new link to continue low latency communication to be backup link 150*b*. In some examples, the new link to continue low latency communication is another link that is not backup link 150*b*. Non-AP MLD 120*a* also switches its data transmission to AP MLD 110 to backup link 150*b* upon either the implicit or explicit notification.

Additionally, or alternatively, when the quality of link 150*a* deteriorates, AP MLD 110 can quickly switch to backup link 150*b* to transmit a link quality change and link switch notification frame to non-AP MLD 120*a* on backup link 150*b*. As discussed in more detail below, non-AP MLD 120*a* may use a receive-only auxiliary radio (e.g., a scan radio, a radio for non-scanning receive-only purposes, etc.) for link 150*b*. Non-AP MLD 120*a* receives the link quality change and link switch notification frame on backup link 150*b*, which informs non-AP MLD 120*a* that the quality of link 150*a* deteriorates and informs non-AP MLD 120*a* of a new link (e.g., link 150*c*) to be used as the new low latency communication link. Since AP MLD 110 and non-AP MLD 120*a* had established link 150*b* as the backup link for the notification frame, switching the communication from link 150*a* to link 150*c* is fast due to the notification frame containing the information of using 150*c* as the new link , the link switch time is reduced, and the channel access time may be reduced.

In some aspects, the notification frame can be either a management frame type or a control frame type. However, the aspects of this disclosure can include other frame types for the notification frame.

Figure 2:
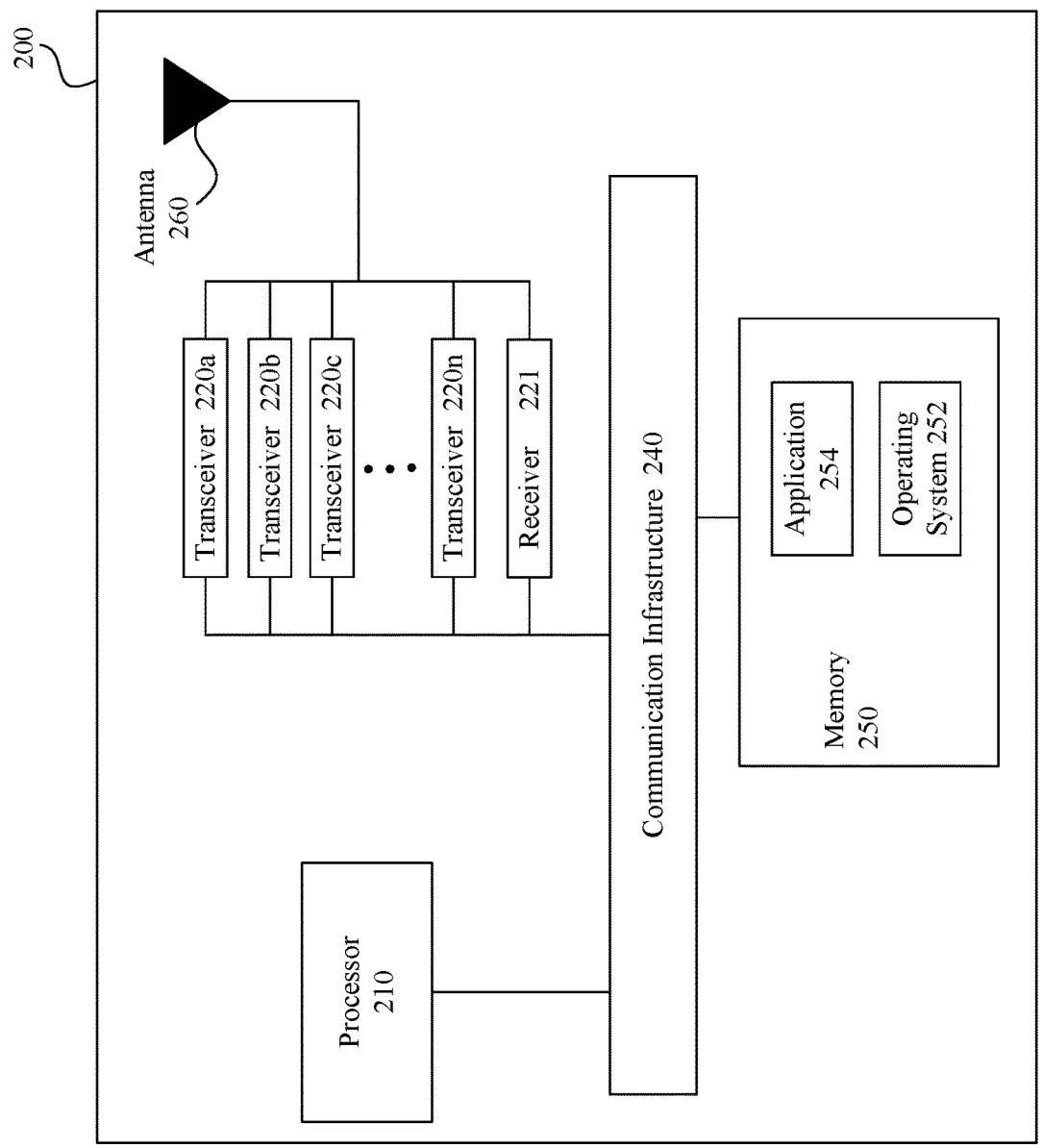
FIG. 2 illustrates a block diagram of an example wireless system of an electronic device implementing the backup link establishment and operation in a communication network, according to some aspects of the disclosure.

FIG. 2 illustrates a block diagram of an example wireless system 200 of an electronic device implementing the backup link establishment and operation for multi-link communication network, according to some aspects of the disclosure. System 200 may be any of the electronic devices (e.g., AP MLD 110, non-AP MLD 120) of system 100. System 200 includes processor 210, one or more transceivers 220*a*-220*n*, one or more receiver(s) 221, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210, one or more transceivers 220*a*-220*n*, and/or one or more receiver(s) 221. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, gaming application(s), and/or other user applications.

System 200 can also include communication infrastructure 240. Communication infrastructure 240 provides communication between, for example, processor 210, one or more transceivers 220*a*-220*n*, one or more receiver(s) 221, and memory 250. In some implementations, communication infrastructure 240 may be a bus. Processor 210 together with instructions stored in memory 250 performs operations enabling wireless system 200 of system 100 to implement the backup link establishment and operation as described herein. Additionally, or alternatively, one or more transceivers 220a-220n and/or one or more receiver(s) 221 perform operations enabling wireless system 200 of system 100 to implement the backup link establishment and operation as described herein.

One or more transceivers 220a-220n transmit and receive communications signals that support the backup link establishment and operation, according to some aspects, and may be coupled to antenna 260. One or more auxiliary radios (or, receiver(s)) 221 receive communications signals that support the backup link establishment and operation, according to some aspects, and may be coupled to antenna 260. (Herein, transceivers can also be referred to as radios). Antenna 260 may include one or more antennas that may be the same or different types. One or more transceivers 220a-220n and/or one or more receiver(s) 221 allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects of this disclosure, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like.

Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a WLAN transceiver) to enable connection(s) and communication over WLAN networks such as, but not limited to, networks based on standards described in IEEE 802.11 (such as, but not limited to IEEE 802.11ac, IEEE 802.11ax, IEEE 802.11bc, IEEE 802.11bd, IEEE 802.11be, etc.). For example, transceiver 220a can enable connection(s) and communication over a multi-link WLAN network having a first link (e.g., link 150a) associated with 2.4 GHz wireless communication channel. For example, transceiver 220b can enable connection(s) and communication over the multi-link WLAN network having a second link (e.g., link 150b) associated with 5 GHz wireless communication channel. For example, transceiver 220c can enable connection(s) and communication over the multi-link WLAN network having a third link (e.g., link 150c) associated with 6 GHz wireless communication channel. However, the aspects of this disclosure are no limited to these wireless channels and other PHY layer links and/or other wireless channels can be used.

Additionally, or alternatively, wireless system 200 can include one WLAN transceiver configured to operate at two or more links. Processor 210 can be configured to control the one WLAN transceiver to switch between different links, according to some examples. For example, transceiver 220a can enable connection(s) and communication over a multi-link WLAN network having a first link (e.g., link 150a) associated with 2.4 GHz wireless communication channel. And transceiver 220b can enable connection(s) and communication over the multi-link WLAN network having a second link (e.g., link 150b) associated with 5 GHz wireless communication channel and can enable connection(s) and communication over the multi-link WLAN network having a third link (e.g., link 150c) associated with 6 GHz wireless communication channel. According to some aspects of the disclosure, the switching from the first link to the second link can include using a transceiver (e.g., transceiver 220b) associated with the second link instead of the transceiver (e.g., transceiver 220a) associated with the first link. Additionally, or alternatively, the switching from the first link to the second link can include controlling a single transceiver (e.g., transceiver 220) to operate at the frequency of the second link instead of operating at the frequency of the first link.

According to some aspects, system 200 can optionally include one or more receiver(s) 221. In some examples, receiver 221 can be a receive-only receiver, for example, a receive-only auxiliary radio. In a non-limiting example, receiver 221 can be a scan radio. In some examples, receiver 221 can be a low power radio that can scan through each channel(s) of a frequency band/link and listen for per channel dwell time. Additionally, or alternatively, receiver 221 can obtain statistics indicating a corresponding channel quality. Receiver 221 can repeat such operation every scan interval. In another non-limiting example, receiver 221 can be a non-scanning radio used for non-scanning purposes. In one example, system 200 can include one receiver 221, which can scan channels in a 2.4 GHz band, in a 5 GHz band, and/or in a 6 GHz band. Alternatively, system 200 can include more than one receiver 221, where a first receiver can scan channels in a 2.4 GHz band and a second receiver can scan in a 5 GHz band and/or in a 6 GHz band. Alternatively, system 200 can include more than one receiver 221, where a first receiver can scan channels in a 2.4 GHz band, and a second receiver can scan in a 5 GHz band, and a third receiver can scan in a 6 GHz band. In other examples, receiver 221 is an auxiliary radio that is a receiver only but can be turned into a transceiver by moving radio resource(s) from transceiver 220 to receiver 221. However, these are provided as examples, and the aspects of this disclosure can include other number of receivers, frequency bands, and/or configurations. In some examples, one or more receiver(s) 221 can include processors, controllers, radios, sockets, plugs, buffers, and like circuits/devices used for scanning on networks.

According to some aspects of this disclosure, processor 210, alone or in combination with computer instructions stored within memory 250, one or more transceiver 220a-220n, and/or one or more receiver(s) 221 implements the backup link establishment and operation in the multi-link communication network as discussed herein. As discussed in more detail below with respect to FIGS. 3-11, processor 210 can implement the backup link establishment and operation in the multi-link communication network of FIGS. 1A, 1B, and 2.

Figure 3:
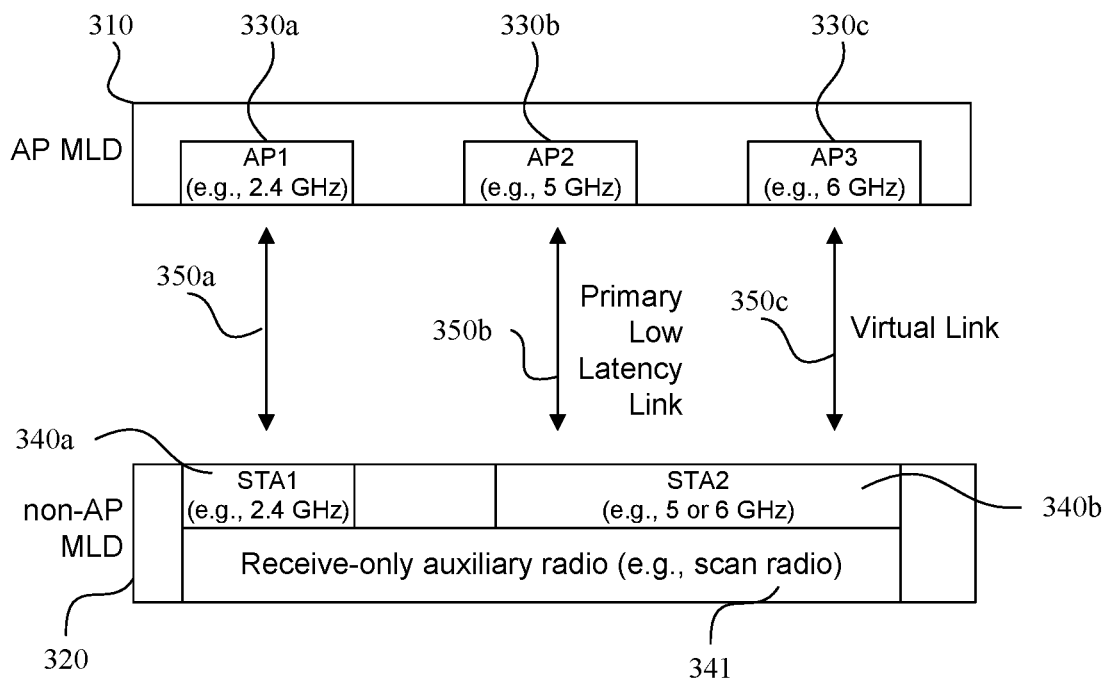
FIG. 3 illustrates an example of communication between an access point (AP) and a station (STA), according to some aspects of the disclosure, according to some aspects of the disclosure.

FIG. 3 illustrates one exemplary communication between AP MLD (multi-link device) 310 and non-AP MLD 320, according to some aspects of the disclosure. In this example, AP MLD 310 and non-AP MLD 320 can communicate using a multi-link WLAN network having two or more links. For example, AP MLD 310 and non-AP MLD 320 can communicate using links 350a-350c. In some examples, links 350 can be and/or include links 150 of FIG. 1B. In some examples, AP MLD 310 can include AP MLD 110 of FIGS. 1A and 1B and non-AP MLD 320 can include one of non-AP MLDs 120a-120c of FIGS. 1A and 1B.

In a non-limiting example, AP MLD 310 can maintain the same or higher number of simultaneous communication links than non-AP MLD 320. According to some aspects, AP MLD 310 can include three transceivers 330a-330c (e.g., AP1-AP3). For example, AP MLD 310 can include transceiver 330a (e.g., AP1) configured to enable connection(s) and communication over a multi-link WLAN network having the first link (e.g., link 350a) associated with 2.4 GHz wireless communication channel. For example, AP MLD 310 can include transceiver 330b (e.g., AP2) configured to enable connection(s) and communication over the multi-link WLAN network having a second link (e.g., link 350b) associated with 5 GHz wireless communication channel. For example, AP MLD 310 can include transceiver 330c (e.g., AP3) configured to enable connection(s) and communication over the multi-link WLAN network having a third link (e.g., link 350c) associated with 6 GHz wireless communication channel. In some examples, AP MLD 310 can conduct communication on 2.4 GHz, 5 GHz, and 6 GHz links simultaneously (e.g., independently from each other). However, the aspects of this disclosure are no limited to these wireless channels and other PHY layer links and/or other wireless channels can be used. Also, AP MLD 310 can include less or more transceivers.

According to some aspects, non-AP MLD 320 can include two transceivers 340a-340b (e.g., STA1 and STA2). For example, non-AP MLD 320 can include transceiver 340a (e.g., STA1) configured to enable connection(s) and communication over a multi-link WLAN network having the first link (e.g., link 350a) associated with 2.4 GHz wireless communication channel. For example, non-AP MLD 320 can include transceiver 340b (e.g., STA2) configured to enable connection(s) and communication over the multi-link WLAN network having a second link (e.g., link 350b) associated with 5 GHz wireless communication channel or configured to enable connection(s) and communication over the multi-link WLAN network having a third link (e.g., link 350c) associated with 6 GHz wireless communication channel. In some examples, non-AP MLD 320 uses transceiver 340b (e.g., STA2) for data communication in either 5 GHz link or 6 GHz link, but not both links simultaneously. In some examples, the unused 5 GHz link or 6 GHz link is called a virtual link. However, the aspects of this disclosure are no limited to these wireless channels and other PHY layer links and/or other wireless channels can be used. Also, non-AP MLD 320 can include less or more transceivers.

According to some aspects, non-AP MLD 320 can include one or more optional receiver(s) 341. The receiver 341 can be a receive-only auxiliary radio. In some examples, receiver 341 can be a receive-only auxiliary radio such as, but not limited to, a scan radio. In some examples, receiver 341 can be a receive-only auxiliary radio such as, but not limited to, a receive-only radio used for non-scanning purpose(s). In some other examples, receiver 341 can be turned into a transceiver by moving radio resource(s) from transceiver(s) 340 to receiver 341. According to some examples, receiver 341 can be configured to receive data and/or scan channel(s) over a first link (e.g., link 350a) associated with 2.4 GHz wireless communication link. Additionally, or alternatively, receiver 341 can be configured to receive data and/or scan channel(s) over a second link (e.g., link 350b) associated with 5 GHz wireless communication link. Additionally, or alternatively, receiver 341 can be configured to receive data and/or scan channel(s) over a third link (e.g., link 350c) associated with 6 GHz wireless communication link. In some examples, non-AP MLD 320 can include more than one receiver 341, each one of receivers 341 can be configured to operate at one or more wireless communication links. However, the aspects of this disclosure are not limited to these wireless channels and other PHY layer links and/or other wireless channels can be used.

In a non-limiting example, as illustrated in FIG. 3, link 350b can be a primary link where AP MLD 310 and non-AP MLD 320 use to communicate the low latency data/traffic (herein referred to as primary low latency link). In this example, link 350c can be a virtual link, which can be used for communication but cannot be used simultaneously with link 350b. As discussed in more detail below, link 350a can be established as the backup link. Additionally, or alternatively, a link between receiver 341 of non-AP MLD 320 and AP MLD 310 can be established as the backup link.

In some examples, the low latency communication is conducted over, for example, primary low latency link 350b, as a result of an explicit or an implicit agreement between AP MLD 310 and non-AP MLD 320. In a non-limiting example of an explicit agreement, during an initial link setup between AP MLD 310 and non-AP MLD 320, AP MLD 310 and non-AP MLD 320 can agree that link 350b is used for low latency communication. For example, during an association operation (e.g., using association request from non-AP MLD 320 to AP MLD 310 and/or using association response form AP MLD 310 to non-AP MLD 320) and/or the other operation (e.g., multi-link setup, TID mapping), AP MLD 310 and non-AP MLD 320 can negotiate to use link 350b for low latency communication. Additionally, or alternatively, AP MLD 310 and non-AP MLD 320 can negotiate the link to use for low latency communication during the multi-link link setup. In some examples, the explicit agreement can include mapping traffic identifiers (TIDs) for low latency traffic only to a specific link (e.g., link 350b).

In a non-limiting example of an implicit agreement, other schemes, such as but not limited to trigger based communication scheme can result in the low latency traffic being communicated over a specific link (e.g., link 350b). In other words, some schemes can imply that a link is to be used as the primary link for the low latency traffic. In this example, no explicit agreement is made between AP MLD 310 and non-AP MLD 320 as which link is used for low latency communication. In the non-limiting example of the trigger based communication scheme, AP MLD 310 can trigger non-AP MLD 320 on a specific link (e.g., link 350b) for non-AP MLD 320 to send low latency traffic to AP MLD 310. Since non-AP MLD 320 is being triggered, for example, a plurality of times on the specific link, non-AP MLD 320 and/or AP MLD 310 can imply that this specific link is the primary link for, for example, the low latency traffic. In another non-limiting example of the trigger based communication scheme, non-AP MLD 320 can ask AP MLD 310 to be triggered at a specific link (e.g., link 350b) for transmitting, for example, low latency traffic to AP MLD 310. Since STA is asking, for example, a plurality of times to be triggered on the specific link, non-AP MLD 320 and/or AP MLD 310 can imply that this specific link is the primary link for, for example, the low latency traffic.

In some examples, if non-AP MLD 320 is not using transceiver 340a and/or receiver 341, transceiver 340a and/or receiver 341 can be in a power save mode. One exemplary power save mode can include a loss-less power save mode or a lossy power save mode. In one example, another power save mode can include a Wireless Network Management (WNM) Sleep mode.

Figure 4:
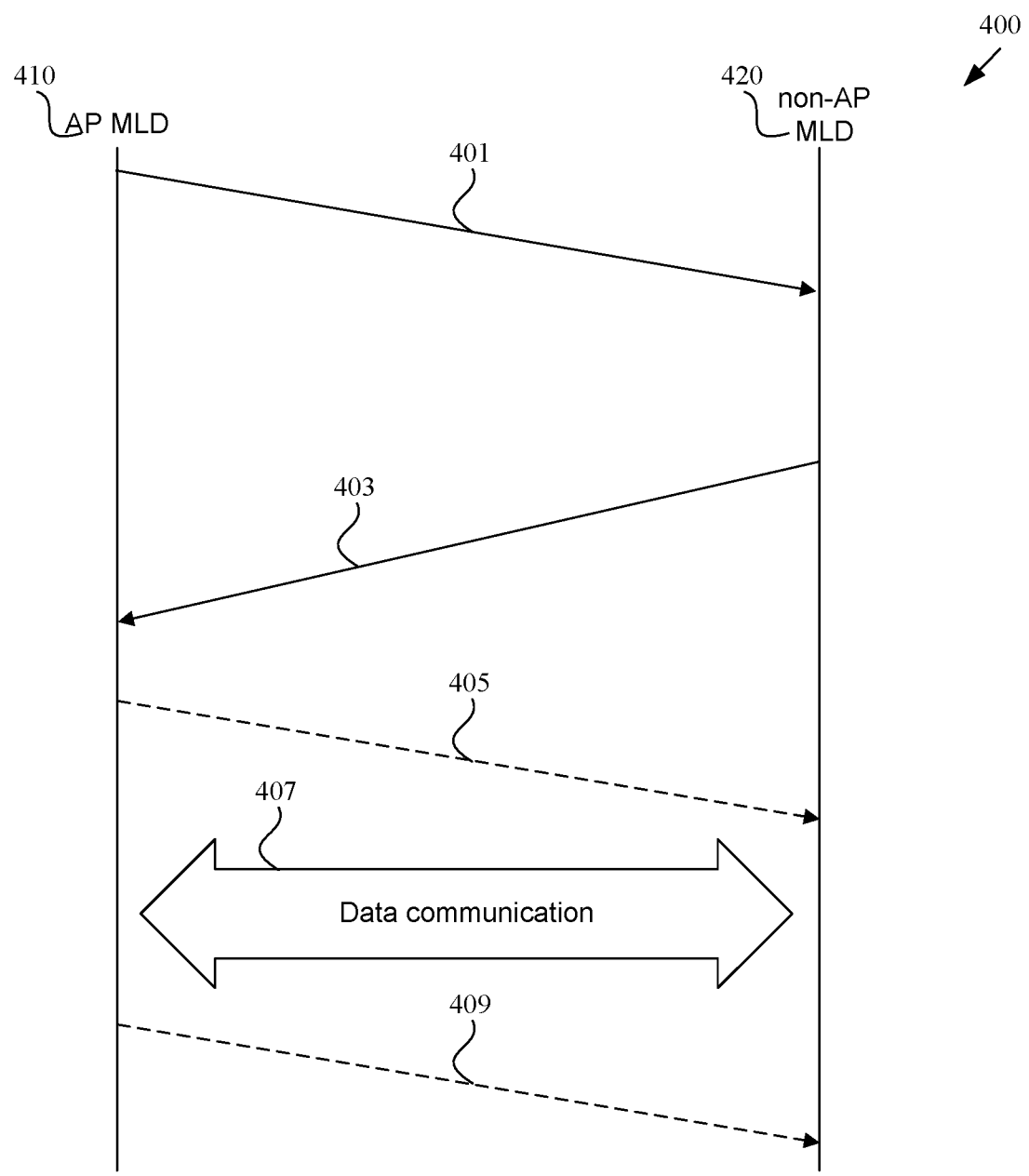
FIG. 4 illustrates an example of communications between an AP MLD and a non-AP MLD to establish the backup link, according to some aspects of the disclosure.

FIG. 4 illustrates exemplary communications between AP MLD 410 and non-AP MLD 420 to establish the backup link, according to some aspects of the disclosure. It is to be appreciated that not all operations in FIG. 4 may be needed, and the operations may not be performed in the same order as shown in FIG. 4.

AP MLD 410 and non-AP MLD 420 can communicate the low latency traffic (or other types of traffic) on a primary low latency link. As discussed above, the primary low latency link can be an explicitly agreed on link or an implicitly agreed on link. FIG. 4 illustrates an exemplary method 400 where AP MLD 410 and non-AP MLD 420 can negotiate one or more backup links. In some examples, method 400 can be part of initial link setup between AP MLD 410 and non-AP MLD 420. For example, method 400 can be performed during an association operation (e.g., using association request from non-AP MLD 420 to AP MLD 410 and/or using association response form AP MLD 410 to non-AP MLD 420). Additionally, or alternatively, AP MLD 410 and non-AP MLD 420 can negotiate the backup link during the multi-link setup process.

AP MLD 410 sends message 401 to non-AP MLD 420 to announce the backup link, according to some aspects. For example, AP MLD 410 can determine and choose the backup link based on, for example, its own preference, and/or input received from non-AP MLD 420 and/or other non-AP MLDs prior to the backup link setup process 400. The input from non-AP MLD 420 and/or other non-AP MLDs can include information corresponding to the links between non-AP MLD 420 (and/or other non-AP MLDs) and AP MLD 410, and the capability of the non-AP MLD 420 and/or other non-AP MLDs. Non-limiting examples of such capability includes whether the non-AP MLDs have additional transceiver or receiver to be used as the backup links, and/or whether there is any limitation on the frame type and format that the non-AP MLDs are capable to receive on a backup link, and the like. Using this information, AP MLD 410 can choose the backup link. The backup link is different from and/or operates independently of the primary low latency link, according to some aspects. As a non-limiting example, the primary link is a 5 GHz wireless communication link and AP-MLD 410 chooses the 2.4 GHz wireless communication link as the backup link. Message 401 includes information associated with the elected backup link, according to some aspects. In some examples, message 401 is a frame used to communicate information associated with the elected backup link. In some examples, message 401 is an individually addressed frame sent only to non-AP MLD 420. In some other examples, message 401 is a group addressed frame (including but not limited to a broadcast frame) sent to a group of non-AP MLDs including non-AP MLD 420.

In response to message 401, non-AP MLD 420 can send message 403 (e.g., a frame) to AP MLD 410. In some examples, using message 403, non-AP MLD 420 can inform AP MLD 410 whether non-AP MLD 420 supports using backup links. For example, if non-AP MLD 420 does not have an additional transceiver or additional receiver, non-AP MLD 420 can inform AP MLD 410 that non-AP MLD 420 does not support using backup link. However, if non-AP MLD 420 has an additional transceiver and/or additional receiver, non-AP MLD 420 can inform AP MLD 410 that non-AP MLD 420 supports using backup link.

Additionally, or alternatively, using message 403, non-AP MLD 420 can inform AP MLD 410 whether non-AP MLD 420 supports the backup link announced by AP MLD 410. For example, if non-AP MLD 420 does not have a transceiver that operates at the channel of the backup link, non-AP MLD 420 can inform AP MLD 410 that non-AP MLD 420 does not support the backup link. Additionally, or alternatively, non-AP MLD 420 can use message 403 to inform AP MLD 410 whether non-AP MLD 420 is using a receive-only receiver (e.g., a scan radio, a radio for non-scanning receive-only purposes, an auxiliary radio that can be turned into a transceiver by moving radio resource(s) from other transceiver to the radio auxiliary, etc.) or a transceiver of the backup link. Additionally, or alternatively, non-AP MLD 420 can use message 403 to communicate additional capability information to AP MLD 410. The additional capability information can include, but are not limited to, supported bandwidth, Modulation and Coding Scheme (MCS) levels, Physical Protocol Data Unit (PPDU) type, and the like. In some examples, the additional capability information are the capability information associated with the backup link and/or associated with the receiver/transceiver associated with the backup link. Additionally, or alternatively, the additional capability information are the capability information associated with one or more links supported by non-AP MLD 420 and/or associated with the receiver/transceiver associated with the one or more links supported by non-AP MLD 420.

In some examples, non-AP MLD 420 can use message 403 to indicate to AP MLD 410 that non-AP MLD 420 agrees with the announced backup link (e.g., endorses the backup link announced by AP MLD 410) and will use the announced backup link. Alternatively, non-AP MLD 420 can use message 403 to indicate to AP MLD 410 whether non-AP MLD 420 has an alternative preferred backup link. As a non-limiting example, the backup link is a 5 GHz wireless communication link and non-AP MLD 420 chooses the 2.4 GHz wireless communication link as the alternative backup link and communicates this backup link to AP MLD 410 using message 403.

In some examples, message 403 is in the form of a single frame. In some other examples, message 403 can be more than one frame to convey all the necessary information.

In an optional step, and depending on message 403, AP MLD 410 may change the backup link. If AP MLD 410 selects a different backup link based at least on message 403 (and/or other information from other non-AP MLDs), AP MLD 410 can send optional message 405 (e.g., a frame) to non-AP MLD 420 to announce the updated backup link.

If no changes are made to the backup link (e.g., no message 405), or after message 405 is transmitted by AP MLD 410, non-AP MLD 420 and AP MLD 410 can start data communication 407. According to some examples, data communication 407 can include low latency communication using the primary low latency link. Additionally, or alternatively, data communication 407 can include low latency communication using the backup link if the quality of the primary low latency link has deteriorated. As discussed above, the backup link is a link that can operate independently of the primary low latency link, according to some aspects.

In some examples, AP MLD 410 and non-AP MLD 420 switch the communication link between the primary low latency link and back up link even when the link quality does not deteriorate on the primary low latency link.

In some examples, the backup link can be updated during the communications between AP MLD 410 and non-AP MLD 420 and/or during the time that non-AP MLD 420 is connected to (e.g., is associated with) AP MLD 410. For example, AP MLD 410 can use an optional message 409 (e.g., a frame) to update the backup link. In some examples, AP MLD 410 may update the backup link based on information AP MLD 410 may receive from non-AP MLD 420. Additionally, or alternatively, AP MLD 410 may update the backup link based on information AP MLD 410 may receive from other non-AP MLDs. In some examples, AP MLD 410 may update the backup link if, for example, the quality of the current backup link deteriorates. In some examples, AP MLD 410 may update the backup link if, for example, the current backup link becomes unavailable (e.g., the current backup link becomes the new low latency link). In some examples, AP MLD 410 may update the backup link if, for example, non-AP MLD 420's backup link preference charges.

According to some aspects, the agreed backup link (or the backup link agreement) between AP MLD 410 and non-AP MLD 420 can be applicable only to low latency traffic that is associated with certain access categories (AC) (such as but not limited voice (AC_VO), video (AC_VI), and the like) and/or certain TIDs associated with low latency traffic. However, the aspects of this disclosure are not limited to these examples and the backup link agreement can be applicable to other traffic too. In some example, the primary low latency link is also used for data communication that does not require low latency, in which case the primary low latency link functions as the primary link of data communication.

As discussed in more detail below, after the backup link establishment, AP MLD 410 and non-AP MLD 420 commit to be available on the backup link during specific time to assist the data communication on the primary low latency link, according to some aspects of this disclosure.

In some examples, messages 401, 403 405 and 409 are the specific frames used only for the backup link establishment. In some other examples, the information contained in these messages are piggybacked onto other frames that also serve other purposes.

Figure 5A:
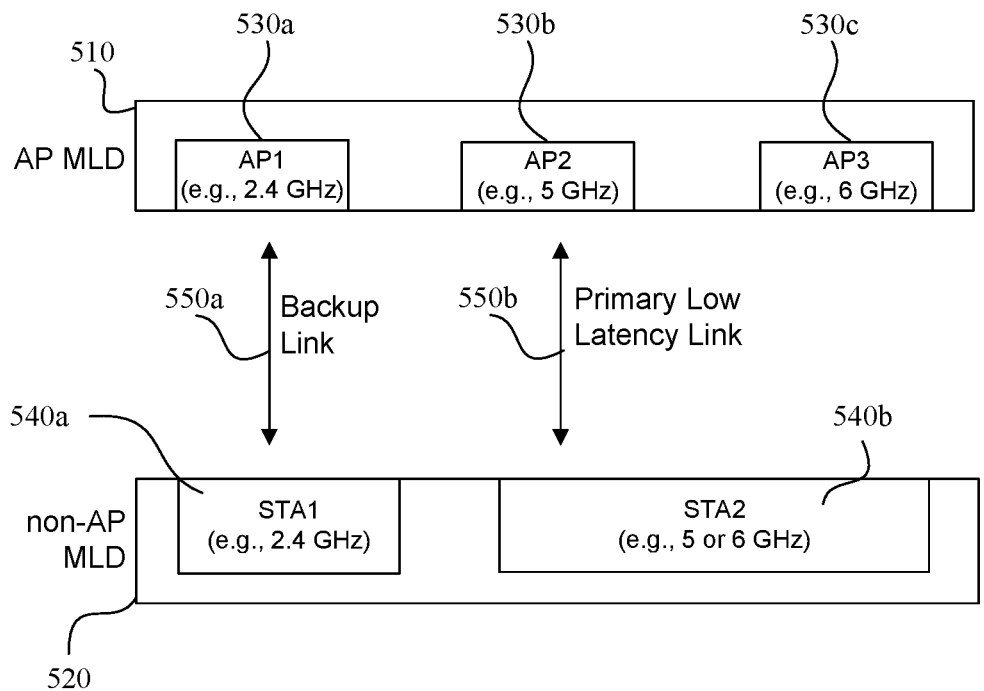
FIGS. 5A, 5B, and 5C illustrate three example backup links between an AP MLD and a non-AP MLD, according to some aspects of the disclosure.
Figure 5B:
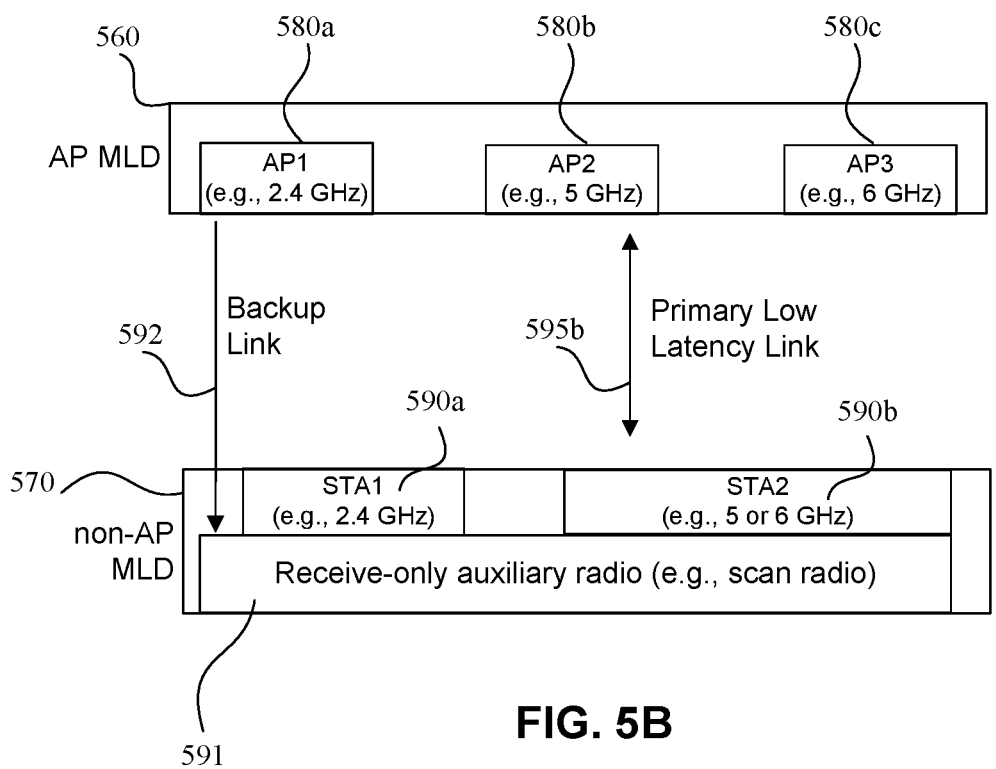
Figure 5C:
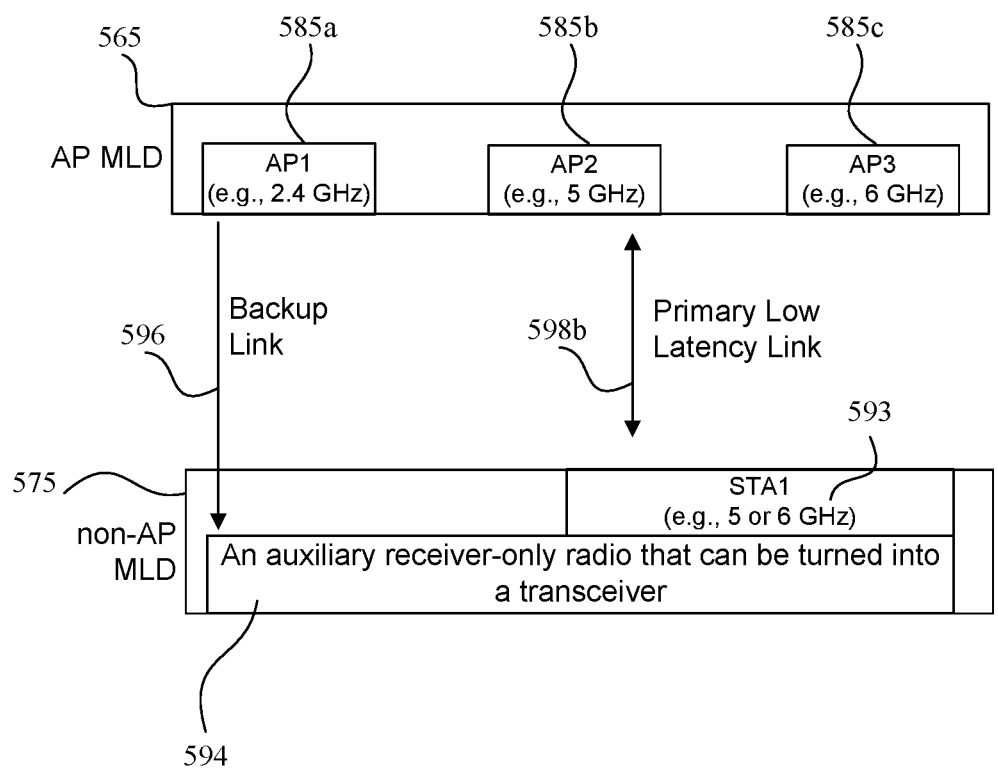

FIGS. 5A, 5B, and 5C illustrate three exemplary backup links between an AP MLD and a non-AP MLD, according to some aspects of the disclosure. FIG. 5A illustrates one example where a transceiver, which is capable of both transmitting and receiving is associated with the backup link. FIG. 5B illustrates an example where a receiver, which is only capable of receiving is associated with the backup link. FIG. 5C illustrates an example where a receiver, which is associated with the backup link, can be turned into a transceiver by moving radio resource from other transceiver and therefore becomes capable of both transmitting and receiving. In some examples, the AP MLD can include AP MLD 110 of FIGS. 1A and 1B and the non-AP MLD can include one of non-AP MLD 120a-120c of FIGS. 1A and 1B.

In the non-limiting example of FIG. 5A, AP MLD 510 can include three transceivers 530a-530c (e.g., AP1-AP3). For example, AP MLD 510 can include transceiver 530a (e.g., AP1) configured to enable connection(s) and communication over a multi-link WLAN network having the first link (e.g., link 550a) associated with 2.4 GHz wireless communication channel. For example, AP MLD 510 can include transceiver 530b (e.g., AP2) configured to enable connection(s) and communication over the multi-link WLAN network having a second link (e.g., link 550b) associated with 5 GHz wireless communication channel. For example, AP MLD 510 can include transceiver 530c (e.g., AP3) configured to enable connection(s) and communication over the multi-link WLAN network having a third link (not shown) associated with 6 GHz wireless communication channel.

According to some aspects, non-AP MLD 520 can include two transceivers 540a-540b (e.g., STA1 and STA2). For example, non-AP MLD 520 can include transceiver 540a (e.g., STA1) configured to enable connection(s) and communication over a multi-link WLAN network having the first link (e.g., link 550a) associated with 2.4 GHz wireless communication channel. For example, non-AP MLD 520 can include transceiver 540b (e.g., STA2) configured to enable connection(s) and communication over the multi-link WLAN network having a second link (e.g., link 550b) associated with 5 GHz wireless communication channel or configured to enable connection(s) and communication over the multi-link WLAN network having a third link (not shown) associated with 6 GHz wireless communication channel, where non-AP MLD 520 does not use the second link and the third link simultaneously.

According to some aspects, link 550b is the primary low latency link and link 550a is the backup link. For example, method 400 discussed with respect to FIG. 4 can be used to determine and select link 550a as the backup link. In this example, transceiver 540a (e.g., STA1), which is capable of both transmitting and receiving data is associated with the backup link.

Although FIG. 5A is discussed with respect to the 5 GHz link being the primary low latency link and the 2.4 GHz link being the backup link, the aspects of this disclosure are not limited to this example and other links can be selected as primary low latency link and/or backup link. In a non-limiting example, the 2.4 GHz link can be the primary low latency link and the 6 GHz link can be the backup link. And so on.

In the non-limiting example of FIG. 5B, AP MLD 560 can include three transceivers 580a-580c (e.g., AP1-AP3). For example, AP MLD 560 can include transceiver 580a (e.g., AP1) configured to enable connection(s) and communication over a multi-link WLAN network having the first link (not shown) associated with 2.4 GHz wireless communication channel. For example, AP MLD 560 can include transceiver 580b (e.g., AP2) configured to enable connection(s) and communication over the multi-link WLAN network having a second link (e.g., link 595b) associated with 5 GHz wireless communication channel. For example, AP MLD 560 can include transceiver 580c (e.g., AP3) configured to enable connection(s) and communication over the multi-link WLAN network having a third link (not shown) associated with 6 GHz wireless communication channel.

According to some aspects, non-AP MLD 570 can include two transceivers 590a-590b (e.g., STA1 and STA2). For example, non-AP MLD 570 can include transceiver 590a (e.g., STA1) configured to enable connection(s) and communication over a multi-link WLAN network having the first link (not shown) associated with 2.4 GHz wireless communication channel. For example, non-AP MLD 570 can include transceiver 590b (e.g., STA2) configured to enable connection(s) and communication over the multi-link WLAN network having a second link (e.g., link 595b) associated with 5 GHz wireless communication channel or configured to enable connection(s) and communication over the multi-link WLAN network having a third link (not shown) associated with 6 GHz wireless communication channel, where non-AP MLD 570 does not use the second link and the third link simultaneously.

According to some aspects, non-AP MLD 570 can include one or more optional receiver(s) 591. The receiver 591 can be a receive-only auxiliary radio such as, but not limited to, a scan radio. In some examples, receiver 591 can be a receive-only auxiliary radio such as, but not limited to, a receive-only radio used for non-scanning purpose(s). According to some examples, receiver 591 can be configured to receive data and/or scan channel(s) over a first link (e.g., link 592) associated with 2.4 GHz wireless communication link. Additionally, or alternatively, receiver 591 can be configured to receive data and/or scan channel(s) over a second link (e.g., link 595*b*) associated with 5 GHz wireless communication link. Additionally, or alternatively, receiver 591 can be configured to receive data and/or scan channel(s) over a third link (not shown) associated with 6 GHz wireless communication link. In some examples, non-AP MLD 570 can include more than one receiver 591, each one of receivers 591 can be configured to operate at one or more wireless communication links.

According to some aspects, link 595*b* is the primary low latency link and link 592 is the backup link. For example, method 400 discussed with respect to FIG. 4 can be used to determine and select link 592 as the backup link. In this example, receiver 591 (e.g., receive-only auxiliary radio such as a scan radio, a radio for non-scanning receive-only purposes, etc.), which is only capable of receiving, is associated with the backup link.

Although FIG. 5B is discussed with respect to the 5 GHz link being the primary low latency link and the 2.4 GHz link being the backup link, the aspects of this disclosure are not limited to this example and other links can be selected as primary low latency link and/or backup link. In a non-limiting example, the 2.4 GHz link can be the primary low latency link and the 6 GHz link can be the backup link. In this example, receiver 591 can be a receive-only auxiliary radio (e.g., a scan radio) configured to operate at the 6 GHz link. In another example, the 5 GHz link can be the primary low latency link and the 6 GHz link can be the backup link. In this example, receiver 591 can be a receive-only auxiliary radio (e.g., a scan radio) configured to operate at the 6 GHz link. And so on.

In the non-limiting example of FIG. 5C, AP MLD 565 can include three transceivers 585*a*-585*c* (e.g., AP1-AP3). For example, AP MLD 565 can include transceiver 585*a* (e.g., AP1) configured to enable connection(s) and communication over a multi-link WLAN network having the first link (not shown) associated with 2.4 GHz wireless communication channel. AP MLD 565 can further include transceiver 585*b* (e.g., AP2) configured to enable connection(s) and communication over the multi-link WLAN network having a second link (e.g., link 598*b*) associated with 5 GHz wireless communication channel. AP MLD 565 can further include transceiver 585*c* (e.g., AP3) configured to enable connection(s) and communication over the multi-link WLAN network having a third link (not shown) associated with 6 GHz wireless communication channel.

According to some aspects, non-AP MLD 575 can include one transceiver 593 (e.g., STA1). For example, non-AP MLD 575 can include transceiver 593 (e.g., STA1) configured to enable connection(s) and communication over the multi-link WLAN network having a second link (e.g., link 598*b*) associated with 5 GHz wireless communication channel or configured to enable connection(s) and communication over the multi-link WLAN network having a third link (not shown) associated with 6 GHz wireless communication channel, where non-AP MLD 575 does not use the second link and the third link simultaneously.

According to some aspects, non-AP MLD 575 can include one or more optional auxiliary transceivers (or, radio(s)) 594. Auxiliary radio 594 can be a receiver-only that normally operates in a listening mode. According to some examples, auxiliary transceiver 594 can be configured to receive data over a first link (e.g., link 596) associated with 2.4 GHz wireless communication link. Additionally, or alternatively, auxiliary transceiver 594 can be configured to receive data over a second link (e.g., link 598*b*) associated with 5 GHz wireless communication link. Additionally, or alternatively, auxiliary transceiver 594 can be configured to receive data a third link (not shown) associated with 6 GHz wireless communication link. In some examples, non-AP MLD 575 can include more than one auxiliary transceiver 594, each one of auxiliary transceiver 594 can be configured to operate at one or more wireless communication links.

According to some aspects, link 598*b* is the primary low latency link and link 596 is the backup link. For example, method 400 discussed with respect to FIG. 4 can be used to determine and select link 596 as the backup link. In this example, auxiliary transceiver 594, which is normally in the listening mode (e.g., receiving), is associated with the backup link.

According to some aspects, auxiliary transceiver 594 normally operates in a listening mode. The listening mode of operation can include clear channel assessment (CCA) and receiving special frames (e.g., special control frames, or special management frames) from AP MLD 565. The radio resource (e.g., antennas) at non-AP MLD 575 can be shared between transceiver 593 (e.g., the main radio) and auxiliary transceiver 594 in a time-sharing fashion on demand, according to some aspects. Upon receiving a special frame (e.g., a notification frame) from AP MLD 565, the radio resource is moved from transceiver 593 (e.g., the main radio) to auxiliary transceiver 594 so that auxiliary transceiver 594 becomes the main radio that is capable of both transmission and reception.

When the primary link quality (e.g., quality of primary link 598*b*) deteriorates, AP MLD 565 transmits a notification frame on backup link 596. Upon the reception of such a notification frame on backup link 596, the radio resource is moved from transceiver 593 to the auxiliary transceiver 594 such that auxiliary transceiver 594 becomes both transmission and reception capable (e.g., backup link 596 changes into the main communication link to carry the low latency communication.) In some aspects, the notification frame can be of either a management frame type or a control frame type.

Although FIG. 5C is discussed with respect to the 5 GHz link being the primary low latency link and the 2.4 GHz link being the backup link, the aspects of this disclosure are not limited to this example and other links can be selected as primary low latency link and/or backup link. In a non-limiting example, the 2.4 GHz link can be the primary low latency link and the 6 GHz link can be the backup link. In this example, auxiliary transceiver 594 can be an auxiliary radio configured to operate at the 6 GHz link. In another example, the 5 GHz link can be the primary low latency link and the 6 GHz link can be the backup link. In this example, auxiliary transceiver 594 can be an auxiliary radio to operate at the 6 GHz link. And so on.

As noted above, each transceiver/radio 330, 530, 580, and/or 585 can also be referred to herein as an AP. Each transceiver/radio 340, 540, 590, and/or 593 can also be referred to herein as an STA. Additionally, or alternatively, a STA and/or an AP is associated with a specific communication link/channel. For example, a first STA (and/or a first AP) is associated with a first link associated with the 2.4 GHz wireless communication channel. A second STA (and/or a second AP) is associated with a second link associated with the 5 GHz wireless communication channel. And, a third STA (and/or a third AP) is associated with a third link associated with the 6 GHz wireless communication channel.

Figure 6:
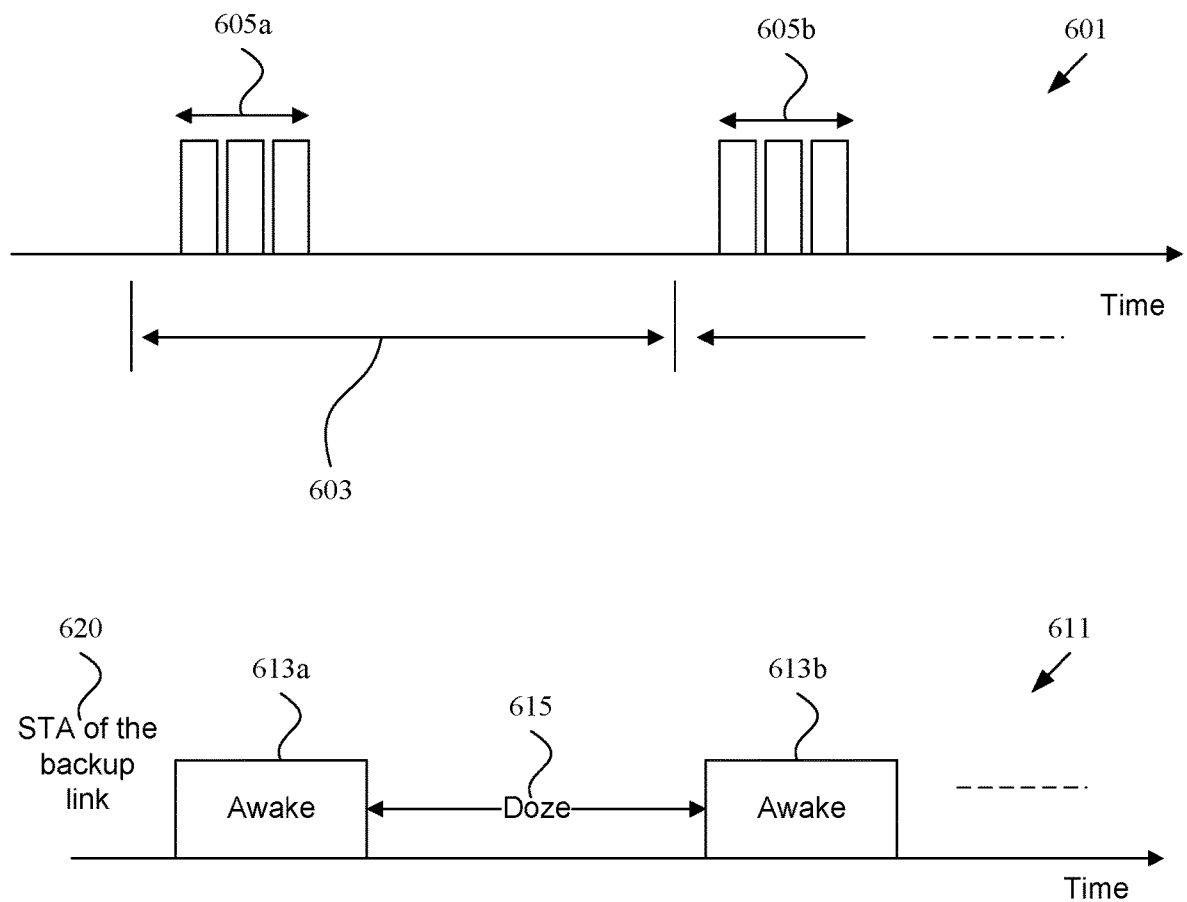
FIGS. 6-7 illustrate example operation of a backup link enabled by a transceiver, according to some aspects of the disclosure.

FIG. 6 illustrates one exemplary operation of a backup link enabled by a transceiver, according to some aspects of the disclosure. According to some examples, the exemplary operation of the backup link as discussed in FIG. 6 is enabled by a transceiver at a non-AP MLD that is capable of both transmitting and receiving data, for example as discussed with respect to FIG. 5A.

According to some aspects, STA 620 is an STA of the backup link of a non-AP MLD. For example, STA 620 can be STA1 (e.g., transceiver 540*a*) of non-AP MLD 520 of FIG. 5A. According to some aspects, traffic schedule 601 is the low latency traffic schedule on a primary link (e.g., primary low latency link 550*b* of FIG. 5A). The non-AP MLD that includes STA 620 can be informed about traffic schedule 601 associated with an AP MLD's traffic (e.g., the data communicated between the non-AP MLD and the AP MLD). For example, the AP MLD can inform the non-AP MLD (and other non-AP MLDs) about traffic schedule 601 associated with the AP MLD's downlink (DL) low latency traffic delivered on the primary low latency link. Additionally, or alternatively, the non-AP MLD that includes STA 620 can obtain the schedule 601 of the traffic delivered on the primary low latency link from upper layers of the non-AP MLD and/or the AP MLD. In some examples, traffic schedule 601 include information about data that is being communicated between the non-AP MLD that includes STA 620 and the AP MLD. The information in traffic schedule 601 can include at least one of traffic period interval 603, burst duration 605, or the like. The information in traffic schedule 601 is not limited to these examples and can include other information about the traffic/data that is being communicated between the non-AP MLD and the AP MLD.

In this exemplary aspect, STA 620 (STA of the backup link) sets a power save schedule 611 associated with the transceiver that operates at the backup link based on traffic schedule 601, the schedule of the uplink data transmission of STA 620, and possibly other information. For example, as illustrated in FIG. 5A, link 550*a* is selected as the backup link and transceiver 540*a* (e.g., STA1-STA 620) is configured to operate at backup link 550*a*. In this example, power save schedule 611 associated with transceiver 540*a* is set based on traffic schedule 601 and possibly other factors. STA 620 sets power save schedule 611 associated with the transceiver that operates at the backup link based on traffic schedule 601 (and possibly other factors) such that STA 620 (e.g., the transceiver that operates at the backup link) is awake during the time of the AP MLD's downlink (DL) traffic deliver. For example, power save schedule 611 can include awake periods 613*a* and 613*b* and sleep or doze periods 615. Awake periods 613 are periods where STA 620 (e.g., the transceiver that operates at the backup link) is an awake state and able to receive DL low latency data from the AP MLD (and/or is able to transmit uplink (UL) low latency data to the AP MLD) when the low latency communication occurs on the primary low latency link, according to some examples. Sleep or doze periods 615 are periods where STA 620 (e.g., the transceiver that operates at the backup link) is in a sleep or doze state of a power save mode, according to some examples.

As illustrated in FIG. 6, STA 620 sets power save schedule 611 associated with STA 620 (e.g., the transceiver that operates at the backup link) based on traffic schedule 601 and may also set power save schedule 611 based on its UL traffic schedule and possibly other factors, such that awake periods 613 encompass burst durations 605, according to some examples. Therefore, during the time that the AP MLD transmits its DL traffic/data, STA 620 (e.g., the transceiver that operates at the backup link) is awake and able to receive the DL traffic/data if needed. By setting power save schedule 611 associated with STA 620 (e.g., the transceiver that operates at the backup link) based on traffic schedule 601, STA 620 commits to be available on the backup link when the low latency traffic is delivered over the primary low latency link, according to some aspects of this disclosure.

In one example, the AP MLD and another STA of the non-AP MLD (e.g., STA2 540*b* of FIG. 5A) can communicate over the primary low latency link (e.g., link 550*b* of FIG. 5A). Additionally, the AP MLD and the non-AP MLD that includes STA 620 has already established the backup link (e.g., link 550*a* of FIG. 5A) as discussed, for example, with respect to FIG. 4, and the non-AP MLD that includes STA 620 has set power save schedule 611 associated with STA 620 (e.g., the transceiver that operates at the backup link) based on traffic schedule 601 (and may also have set power save schedule 611 based on the UL traffic schedule of STA 620 and possibly other factors). In this example, if the AP MLD determines that the quality of the primary low latency link has deteriorated, the AP MLD can first transmit a link quality deterioration and link switch notification frame to STA 620 on the backup link, then switch the traffic to the backup link (e.g., link 550*a* and use transceiver 530*a*) to continue to communicate with STA 620 using the backup link. In this example, since STA 620 has set power save schedule 611 based on traffic schedule 601, STA 620 can receive the traffic from the AP MLD without any interruption and/or without consuming any additional channel switch time. In some example, the new link to continue the low latency communication is another link indicated in the notification frame that is different from the backup link. In some examples, the data communication is switched between the primary low latency link and the backup link for other reasons, even when the link quality of the primary low latency link does not deteriorate.

Figure 7:
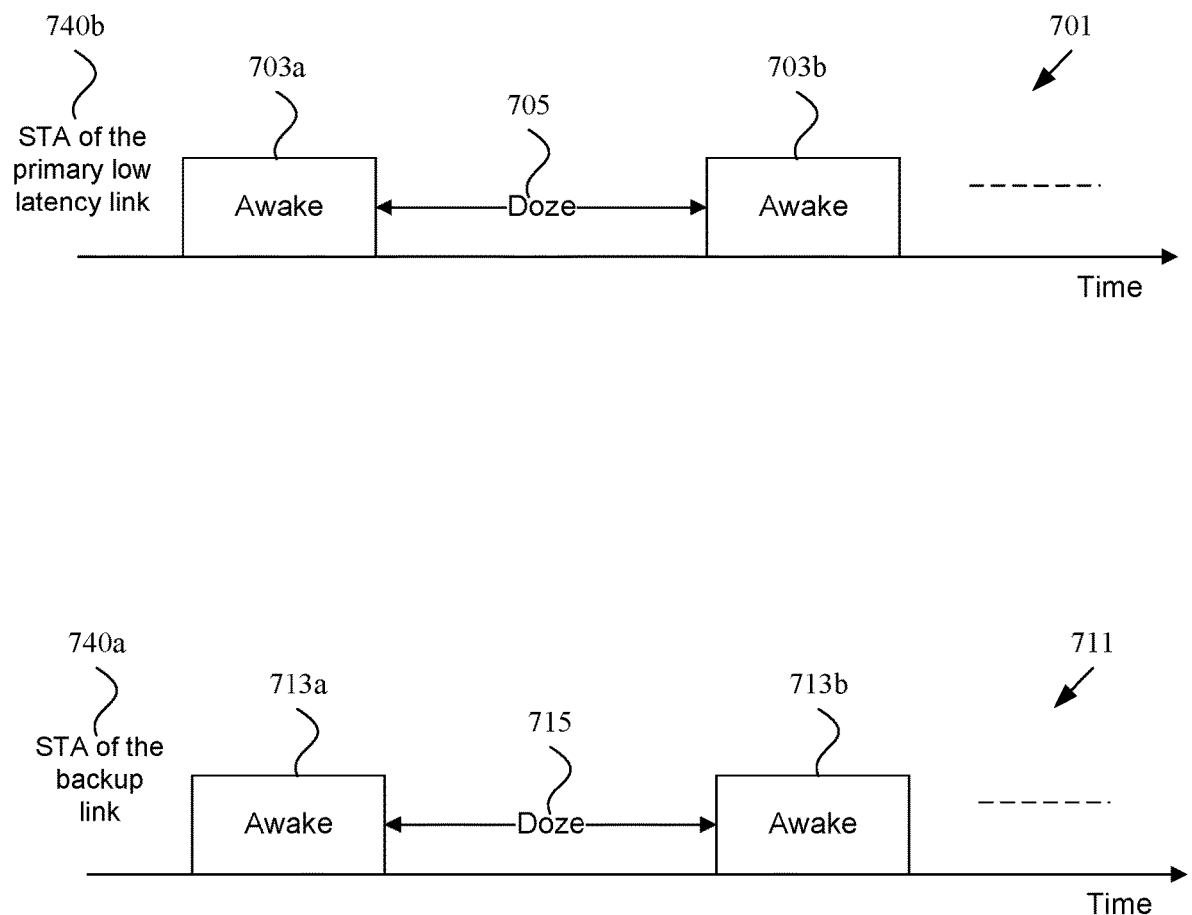

FIG. 7 illustrates another exemplary operation of a backup link enabled by a transceiver, according to some aspects of the disclosure. According to some examples, the exemplary operation of the backup link as discussed in FIG. 7 is enabled by a transceiver at a non-AP MLD that is capable of both transmitting and receiving data, for example as discussed with respect to FIG. 5A.

FIG. 7 illustrates an exemplary power save schedule 701 of STA 740*b* of a primary low latency link of a non-AP MLD. In other words, STA 740*b* is an STA of the non-AP MLD that operates at the primary low latency link (e.g., transceiver 540*b* (STA2) operating on link 550*b* of FIG. 5A). FIG. 7 also illustrates exemplary power save schedule 711 of STA 740*a* of a backup link of the non-AP MLD. In other words, STA 740*a* is an STA of the non-AP MLD that operates at the backup link (e.g., transceiver 540*a* (STA1) operating on link 550*a* of FIG. 5A). According to some aspects, STA 740*b* can establish a power save agreement with the AP (e.g., AP2 of FIG. 5A) on the primary low latency link (e.g., link 550*b* of FIG. 5A). In one example, the power save agreement can include a Target Wake Time (TWT) agreement. However, the aspects of this disclosure are not limited to TWT agreement and can include other power save agreements between the STA and AP (and/or between STAs and/or between APs). In some examples, STA 740b and the AP can establish the power save agreement during the initial link setup between the AP MLD (that includes the AP) and the non-AP MLD (that includes STAs 740a and 740b). For example, the power save agreement establishment can be performed during an association operation (e.g., using association request and/or association response). Additionally, or alternatively, the power save agreement establishment can be negotiated after the initial link setup. However, the aspects of this disclosure are not limited to these examples and other methods can be used to establish the power save agreement for the primary low latency link.

In some examples, the power save agreement for the primary low latency link can include power save schedule 701. For example, power save schedule 701 can include one or more awake periods 703a and 703b and one or more sleep or doze periods 705. Awake periods 703 are periods where STA 740b (e.g., the transceiver that operates at the primary low latency link) is an awake state and able to receive DL data from the AP (and is able to transmit uplink (UL) data to the AP), according to some examples. Sleep or doze periods 705 are periods where STA 740b (e.g., the transceiver that operates at the primary low latency link) is in a sleep or doze state of a power save mode, according to some examples.

In some examples, STA 740a (or the non-AP MLD that includes STA 740b) sets power save schedule 711 of STA 740a (e.g., transceiver 540a on link 550a of FIG. 5A) based on power save schedule 701 of STA 740b (e.g., the transceiver configured to operate at the primary low latency link for example, transceiver 540b on link 550b) and possibly some other factors. Power save schedule 711 of the STA 740a (e.g., transceiver 540a on link 550a of FIG. 5A) can include awake periods 713a and 713b and sleep or doze periods 715. Awake periods 713 are periods where STA 740a (e.g., the transceiver that operates at the backup link) is in an awake state and able to receive DL data from the AP (and is able to transmit uplink (UL) data to the AP) when the low latency communication occurs on the primary low latency link, according to some examples. Sleep or doze periods 715 are periods where STA 740a (e.g., the transceiver that operates at the backup link) is in a sleep or doze state of a power save mode, according to some examples.

According to some aspects, setting power save schedule 711 of STA 740a (e.g., the transceiver configured to operate at the backup link for example, transceiver 540a on link 550a of FIG. 5A) based on power save schedule 701 of STA 740b (e.g., the transceiver configured to operate at the primary low latency link for example, transceiver 540b on link 550b of FIG. 5A) and based on possibly some other factors can include setting the awake periods (703 and 713) to have the same or substantially the same duration and to setting the awake periods (703 and 713) to start at the same or substantially the same time. Additionally, or alternatively, setting power save schedule 711 of STA 740a (e.g., the transceiver configured to operate at the backup link for example, transceiver 540a on link 550a of FIG. 5A) based on power save schedule 701 of STA 740b (e.g., the transceiver configured to operate at the primary low latency link for example, transceiver 540b on link 550b of FIG. 5A) and based on possibly some other factors can include setting the sleep/doze periods (705 and 715) to have the same or substantially the same duration and to setting the sleep/doze periods (705 and 715) to start at the same or substantially the same time.

In some examples, setting power save schedule 711 of STA 740a (e.g., the transceiver configured to operate at the backup link for example, transceiver 540a on link 550a of FIG. 5A) based on power save schedule 701 of STA 740b (e.g., the transceiver configured to operate at the primary low latency link for example, transceiver 540b on link 550b of FIG. 5A) can include setting awake periods 713 of power save schedule 711 to encompass awake periods 703 of power save schedule 701.

Therefore, during the time that STA 740b (e.g., the transceiver that operates at the primary low latency link) is in the awake state, STA 740a (e.g., the transceiver that operates at the backup link) is also at the awake state and is able to receive a notification and the DL traffic/data if needed. By setting power save schedule 711 of STA 740a (e.g., the transceiver configured to operate at the backup link for example, transceiver 540a on link 550a of FIG. 5A) based on power save schedule 701 of STA 740b (e.g., the transceiver configured to operate at the primary low latency link for example, transceiver 540b on link 550b of FIG. 5A), STA 740a commits to be available on the backup link when STA 740b is awake on the primary low latency link, according to some aspects of this disclosure.

In one example, the AP MLD and STA 740b can communicate over the primary low latency link (e.g., link 550b of FIG. 5A). Additionally, the AP MLD and STA 740a has already established the backup link (e.g., link 550a of FIG. 5A) as discussed, for example, with respect to FIG. 4, and the non-AP MLD that includes STAs 740a and 740b has set power save schedule 711 associated with STA 740a (e.g., the transceiver that operates at the backup link) based on power save schedule 701 associated with STA 740b (e.g., the transceiver that operates at the primary low latency link). In this example, if the AP MLD determines that the quality of the primary low latency link has deteriorated, the AP MLD can first transmit a link quality deterioration and link switch notification frame to STA 740a on the backup link, then switch the traffic to the backup link (e.g., link 550a and use transceiver 530a) to continue to communicate (e.g., transmit DL traffic) with the non-AP MLD that includes STAs 740a and 740b using the backup link. In this example, since the non-AP MLD that includes STAs 740a and 740b has set power save schedule 711 associated with STA 740a (e.g., the transceiver that operates at the backup link) based on power save schedule 701 associated with STA 740b (e.g., the transceiver that operates at the primary low latency link), the non-AP MLD can receive the notification frame and traffic from the AP MLD without any interruption and/or without consuming any additional channel switch time. In some example, the new link to continue the low latency communication is another link indicated in the notification frame that is different from the backup link. In some examples, the data communication is switched between the primary low latency link and the backup link for other reasons, even when the link quality of the primary low latency link does not deteriorate.

Figure 8:
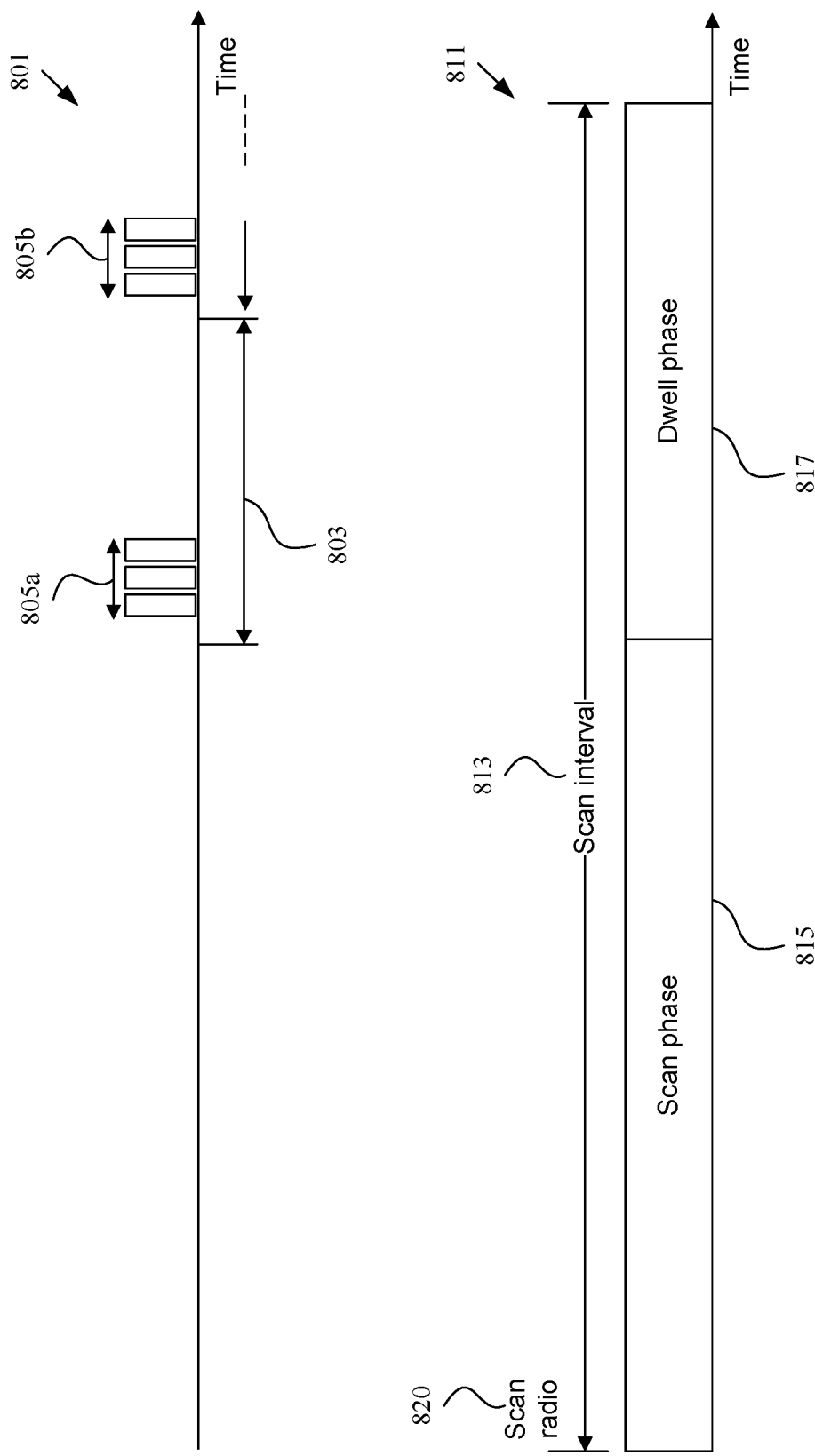
FIGS. 8-9 illustrate example operation of a backup link enabled by a receiver, according to some aspects of the disclosure.

FIG. 8 illustrates one exemplary operation of a backup link enabled by a receiver, according to some aspects of the disclosure. According to some examples, the exemplary operation of the backup link as discussed in FIG. 8 is enabled by a receiver at a non-AP MLD that is capable of receiving data, for example, as discussed with respect to FIG. 5B. In some examples, the receiver is a scan radio capable of only receiving data.

According to some aspects, scan radio 820 is a receive-only auxiliary radio of the backup link of a non-AP MLD. For example, scan radio 820 can be receive-only auxiliary radio 591 of non-AP MLD 570 of FIG. 5B. Although radio 820 is discussed with respect to a scan radio, radio 820 can include other receive-only auxiliary radios. According to some aspects, traffic schedule 801 is the low latency traffic schedule on a primary link (e.g., primary low latency link 595*b* of FIG. 5B). The non-AP MLD that includes scan radio 820 can be informed about traffic schedule 801 associated with an AP MLD's traffic (e.g., the data communicated between the non-AP MLD and the AP MLD). For example, the AP MLD can inform the non-AP MLD that includes scan radio 820 about traffic schedule 801 associated with the AP MLD's downlink (DL) low latency traffic. Additionally, or alternatively, the non-AP MLD can obtain the traffic schedule 801 from upper layers of the non-AP MLD and/or the AP MLD. In some examples, traffic schedule 801 includes information about data that is being communicated between the non-AP MLD and the AP MLD. The information in traffic schedule 801 can include at least one of traffic period interval 803, burst duration 805, or the like. The information in traffic schedule 801 is not limited to these examples and can include other information about the traffic/data that is being communicated between the non-AP MLD and the AP MLD.

In this exemplary aspect, where the non-AP MLD enables the backup link using scan radio 820, which is a receiver that is a scan radio, the non-AP MLD sets a scan schedule 811 associated with scan radio 820 (e.g., the receive-only auxiliary receiver for example receiver 591 of FIG. 5B) based on traffic schedule 801. For example, as illustrated in FIG. 5B, link 592 is selected as the backup link and receiver 591 is configured to operate at backup link 592 during the dwell phase 817 and/or scan the channels in the network during the scan phase 815. In this example, scan schedule 811 associated with receiver 591 is set based on traffic schedule 801.

According to some examples, scan schedule 811 can have scan interval 813, which can include scan phase 815 and dwell phase 817. In some examples, scan phase 815 includes a phase (e.g., a time period) where scan radio 820 (e.g., the receive-only auxiliary receiver for example, a scan radio such as receiver 591 of FIG. 5B) is configured to scan through channel(s) to collect network statistics. For example, during scan phase 815, scan radio 820 can listen for per channel and/or obtain statistics indicating a corresponding channel quality. Scan phase 815 can repeat in each scan interval 811. In some examples, each scan phase 815 can include one or more time periods. At each of the one or more time periods, scan radio 820 can scan a channel within, for example, the 2.4 GHz link, the 5 GHz link, and/or the 6 GHz link. In a non-limiting example, the 2.4 GHz link can include 11 channels and scan phase 815 can include 11 time periods. Each one of the 11 time periods can be used to scan the corresponding channels within the 2.4 GHz link. However, the aspects of this disclosure are not limited to this example, and scan phase 815 can be used for other frequency bands/links. In some examples, during the scan phase 815, scan radio 820 listens to the channel and obtains statistics indicating the corresponding channel quality. The statistics can include, but are not limited to, channel busy time, channel load, and the like.

In some examples, dwell phase 817 can include a phase (e.g., a time period) where the receive-only receiver can be available to receive notification frame(s) from the AP MLD on the backup link if needed. In other words, during dwell phase 817, scan radio 820 (e.g., receiver 591 of FIG. 5B) does not perform the scan function and can be "parked" at the backup link (e.g., link 592 of FIG. 5B) to assist with the primary low latency link (e.g. link 595*b* of FIG. 5B). For example, during dwell phase 817, scan radio 820 (e.g., receiver 591 of FIG. 5B) is in an awake state and configured to receive the notification frame on the backup link (e.g., link 592 of FIG. 5B) if needed. Dwell phase 817 can occur in each scan interval 811.

Scan radio 820 and/or the non-AP MLD that includes scan radio 820 sets scan schedule 811 associated with scan radio 820 (e.g., the receive-only receiver such as the scan radio) that operates at the backup link based on traffic schedule 801 such that scan radio 820 is awake and configured to receive the notification frame on the backup link if needed, during the time of the low latency communication on the primary low latency link. As illustrated in FIG. 8, the non-AP MLD and/or scan radio 820 sets scan schedule 811 associated with scan radio 820 based on traffic schedule 801 such that dwell phase 817 encompass burst durations 805, according to some examples. Therefore, during the times 805 that AP MLD transmits its DL traffic/data on the primary low latency link, scan radio 820 is able to receive notification frames if needed. By setting scan schedule 811 associated with scan radio 820 based on traffic schedule 801, scan radio 820 commits to be available on the backup link during the time of low latency communication on the primary low latency link, according to some aspects of this disclosure.

In one example, the AP MLD and the non-AP MLD that includes scan radio 820 can communicate over the primary low latency link (e.g., link 595*b* of FIG. 5B). Additionally, the AP MLD and the non-AP MLD has already established the backup link (e.g., link 592 of FIG. 5B) as discussed, for example, with respect to FIG. 4. Additionally, or alternatively, the non-AP MLD has informed the AP MLD that the backup link (e.g., link 592 of FIG. 5B) corresponds to scan radio 820 (e.g., a receive-only auxiliary receiver 591 of FIG. 5B such as a scan radio) and its capability (e.g., the type of frames the scan radio 820 is capable of receiving), as discussed, for example, with respect to FIG. 4. Also, the non-AP MLD and/or scan radio 820 has set scan schedule 811 associated with scan radio 820 based on traffic schedule 801. According to some examples, if the AP MLD determines that the quality of the primary low latency link has deteriorated, the AP MLD can transmit a notification frame to scan radio 820 using the backup link. The non-AP MLD can receive the notification frame on scan radio (e.g., the receive-only auxiliary receiver). In some examples, the notification frame can include a link quality change and link switch notification frame, which informs the non-AP MLD that the quality of the primary low latency link has deteriorated and informs the non-AP MLD of a new link to be used as the new low latency communication link to continue the communication. In one example, as illustrated in FIG. 5B, the new low latency link can be the 6 GHz link between transceiver 580*c* of AP MLD 560 and transceiver 590*b* of non-AP MLD 570. However, the aspects of this disclosure are not limited to these examples, and other combination of links can be used as the primary low latency link, the backup link, and the new low latency link.

After receiving the notification frame, the non-AP MLD can switch to the new low latency link to continue the low latency communication between the AP MLD and the non-AP MLD . In this example, since the non-AP MLD has set scan schedule 811 associated with scan radio 820 based on traffic schedule 801, scan radio 820 can receive the notification frame from the AP MLD without any interruption and/or without consuming any additional channel switch time. In some examples, the scan radio is capable of receiving the DL data frames and sending an acknowledge frame to a received DL data frame, so that the backup link can receive the DL traffic in addition to receiving the notification frame.

In some examples, within non-AP MLD 570, the link 592 is enabled by a receiver that is not a scan radio, where such a receiver needs to be available to receive packet when the low latency traffic are delivered at the primary low latency link. When the link quality deteriorates on the primary low latency link, the AP MLD transmits a notification on link quality deterioration and the information on the new link to switch to in order to continue the low latency communication.

Figure 9:
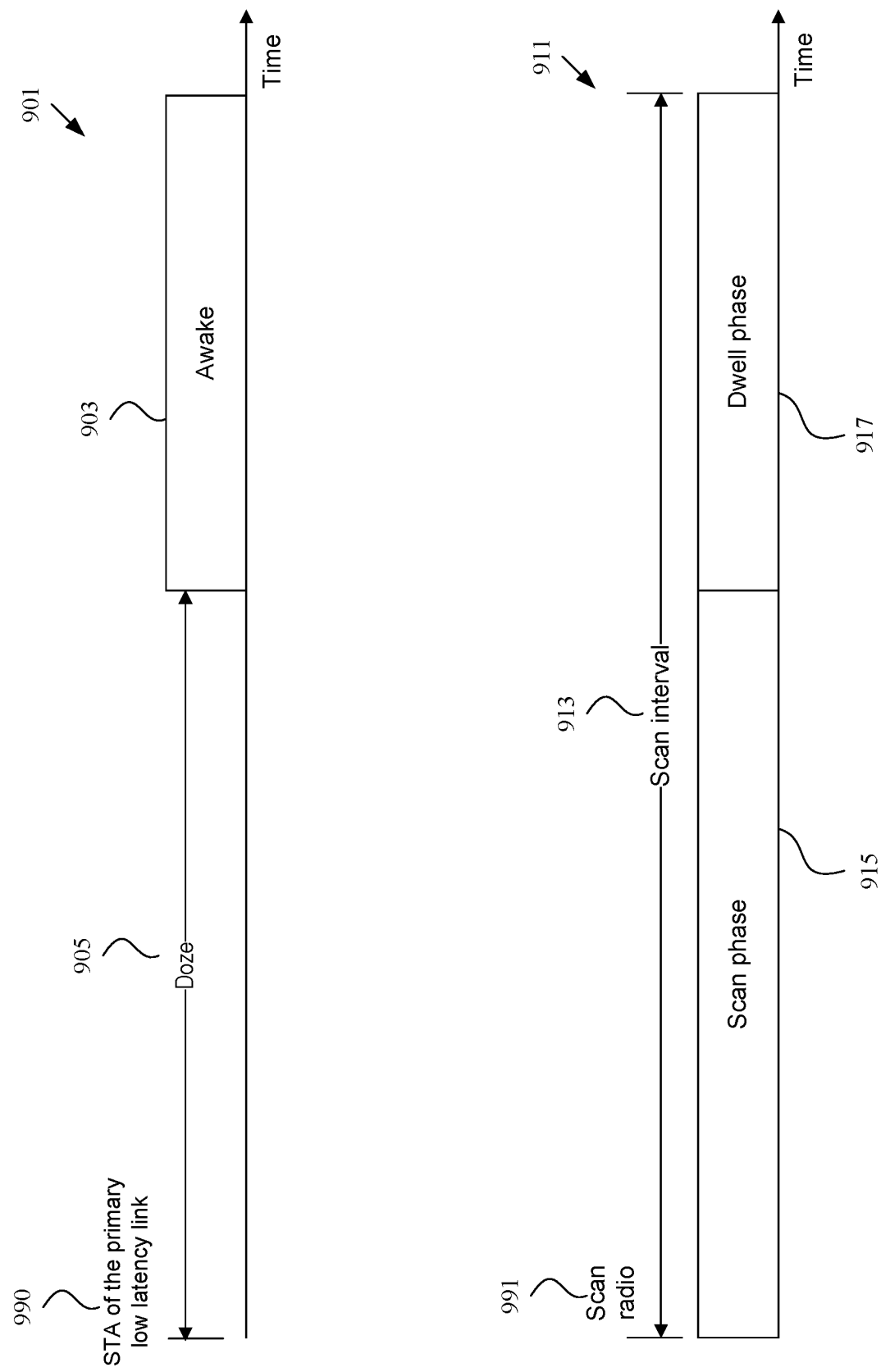

FIG. 9 illustrates another exemplary operation of a backup link enabled by a receiver, according to some aspects of the disclosure. According to some examples, the exemplary operation of the backup link as discussed in FIG. 9 is enabled by a receiver at a non-AP MLD that is capable of receiving data, for example, as discussed with respect to FIG. 5B. In some examples, the receiver is a scan radio capable of only receiving data.

FIG. 9 illustrates an exemplary power save schedule 901 of STA 990 of a primary low latency link of a non-AP MLD. In other words, STA 990 is an STA of the non-AP MLD that operates at the primary low latency link (e.g., link 595*b* of FIG. 5B). According to some aspects, STA 990 can establish a power save agreement with the AP on the primary low latency link (e.g., link 595*b* of FIG. 5B). In one example, the power save agreement can include a Target Wake Time (TWT) agreement. However, the aspects of this disclosure are not limited to TWT agreement and can include other power save agreements between the STA and the AP (and/or between STAs and/or between APs). In some examples, the non-AP MLD that includes STA 990 and the AP MLD can establish the power save agreement during the initial link setup between the AP MLD and the non-AP MLD. For example, the power save agreement establishment can be performed during an association operation (e.g., using association request and/or association response). Additionally, or alternatively, the power save agreement establishment can be negotiated after the initial link setup. However, the aspects of this disclosure are not limited to these examples and other methods can be used to establish the power save agreement for the primary low latency link.

In some examples, the power save agreement for the primary low latency link can include power save schedule 901. For example, power save schedule 901 can include one or more awake period(s) 903 and one or more sleep or doze period(s) 905. Awake periods 903 are periods where the transceiver that operates at the primary low latency link is an awake state and able to receive DL data from the AP MLD (and is able to transmit uplink (UL) data to the AP MLD), according to some examples. Sleep or doze periods 905 are periods where the transceiver that operates at the primary low latency link is in a sleep or doze state of a power save mode, according to some examples. In some examples, the power save schedule 901 are established based on the traffic schedule and other information.

In this exemplary aspect, where the non-AP MLD that includes STA 990 enables the backup link using a receiver such as scan radio 991, the non-AP MLD sets a scan schedule 911 associated with scan radio 991 (e.g., a receive-only auxiliary receiver such as receiver 591 of FIG. 5B) based on power save schedule 901. For example, as illustrated in FIG. 5B, link 592 is selected as the backup link and receiver 591 is configured to operate at backup link 592 during the dwell phase 917 and/or scan the channel in the network during the scan phase 915. In this example, scan schedule 911 associated with receiver 591 is set based on power save schedule 901. According to some aspects, scan radio 991 is a receive-only auxiliary radio of the backup link of a non-AP MLD. For example, scan radio 991 can be receive-only auxiliary radio 591 of non-AP MLD 570 of FIG. 5B. Although radio 991 is discussed with respect to a scan radio, radio 991 can include other receive-only auxiliary radios.

According to some examples, scan schedule 911 can have scan interval 913, which can include scan phase 915 and dwell phase 917. In some examples, scan phase 915 includes a phase (e.g., a time period) where scan radio 991 (e.g., the receive-only auxiliary receiver (e.g., a scan radio) such as receiver 591 of FIG. 5B) is configured to scan through channel(s). For example, during scan phase 915, scan radio 991 can listen for per channel and/or obtain statistics indicating a corresponding channel quality. Scan phase 915 can occur in each scan interval 911. Scan phase 915 is similar to scan phase 815 discussed above with respect to FIG. 8.

In some examples, dwell phase 917 can include a phase (e.g., a time period) where scan radio 991 can be available to receive notification frame(s) from the AP MLD on the backup link. In other words, during dwell phase 917, scan radio 991 (e.g., receiver 591 of FIG. 5B) can be "parked" at the backup link (e.g., link 592 of FIG. 5B) to assist with the primary low latency link (e.g. link 595*b* of FIG. 5B). For example, during dwell phase 917, scan radio 991 (e.g., receiver 591 of FIG. 5B) can be configured to receive the notification frame on the backup link (e.g., link 592 of FIG. 5B). Dwell phase 917 can occur in each scan interval 911.

According to some aspects, setting scan schedule 911 of scan radio 991 (e.g., receive-only auxiliary receiver 591 of FIG. 5B) based on power save schedule 901 of STA 990 (e.g., the transceiver configured to operate at the primary low latency link such as transceiver 590*b* on link 595*b* of FIG. 5B) can include setting dwell phase 917 to have the same or substantially the same duration as awake period 903 and/or setting dwell phase 917 to start at the same or substantially the same time as awake period 903. Additionally, or alternatively, setting scan schedule 911 of scan radio 991 (e.g., receive-only auxiliary receiver 591 of FIG. 5B) based on power save schedule 901 of STA 990 (e.g., the transceiver configured to operate at the primary low latency link such as transceiver 590*b* on link 595*b* of FIG. 5B) can include setting scan phase 915 to have the same or substantially the same duration as sleep/doze period 905 and/or setting scan phase 915 to start at the same or substantially the same time as sleep/doze period 905.

In some examples, setting scan schedule 911 of scan radio 991 (e.g., receive-only auxiliary receiver 591 of FIG. 5B) based on power save schedule 901 of STA 990 (e.g., the transceiver configured to operate at the primary low latency link such as transceiver 590*b* on link 595*b* of FIG. 5B) can include setting dwell phase 917 of scan schedule 911 to encompass awake period 903 of power save schedule 901.

Therefore, during the time that STA 990 (e.g., the transceiver that operates at the primary low latency link) is in the awake state, scan radio 991 (e.g., the receive-only auxiliary receiver) is awake and able to receive the notification frame(s) on the backup link if needed. By setting scan schedule 911 associated with scan radio 991 based on power save schedule 901, scan radio 991 commits to be available on the backup link when STA 990 is awake on the primary link, according to some aspects of this disclosure.

In one example, the AP MLD and STA 991 can communicate over the primary low latency link (e.g., link 595*b* of FIG. 5B). Additionally, the AP MLD and the non-AP MLD that includes STA 990 and scan radio 991 has already established the backup link (e.g., link 592 of FIG. 5B) as discussed, for example, with respect to FIG. 4. Additionally, or alternatively, the non-AP MLD has informed the AP MLD that the backup link (e.g., link 592 of FIG. 5B) corresponds to scan radio 991 (e.g., a receive-only auxiliary receiver 591 of FIG. 5B such as a scan radio) and its capability (e.g., the type of frames the scan radio 820 is capable of receiving), as discussed, for example, with respect to FIG. 4. Also, the non-AP MLD has set scan schedule 911 associated with scan radio 991 based on power save schedule 901. According to some examples, if the AP MLD determines that the quality of the primary low latency link has deteriorated, the AP MLD can transmit a notification frame to scan radio 991 using the backup link. The non-AP MLD can receive the notification frame on scan radio 991 (e.g., the receive-only auxiliary receiver). In some examples, the notification frame can include a link quality change and link switch notification frame, which informs the non-AP MLD that the quality of the primary low latency link has deteriorated and informs the non-AP MLD of a new link to be used as the new low latency communication link to continue the communication. In one example, as illustrated in FIG. 5B, the new low latency link can be the 6 GHz link between transceiver 580*c* of AP MLD 560 and transceiver 590*b* of non-AP MLD 570. However, the aspects of this disclosure are not limited to these examples, and other combination of links can be used as the primary low latency link, the backup link, and the new low latency link.

After receiving the notification frame, the non-AP MLD that includes STA 991 and scan radio 991 can switch to the new low latency link to continue the low latency communication between the AP MLD and the non-AP MLD . In this example, since the non-AP MLD has set scan schedule 911 associated with scan radio 991 based on power save schedule 901, the non-AP MLD can receive the notification frame on scan radio 991 from the AP MLD without any interruption and/or without consuming any channel switch time. In some examples, the scan radio is capable of receiving the DL data frames and sending an acknowledge frame to a received DL data frame, so that the backup link can receive the DL traffic in addition to receiving the notification frame.

In some examples, within non-AP MLD 570, the link 592 is enabled by a receiver that is not a scan radio, where such a receiver needs to be available to receive packet when the low latency traffic are delivered at the primary low latency link. When the link quality deteriorates on the primary low latency link, the AP MLD transmits a notification on link quality deterioration and/or the information on the new link to switch to in order to continue the low latency communication.

Figure 10:
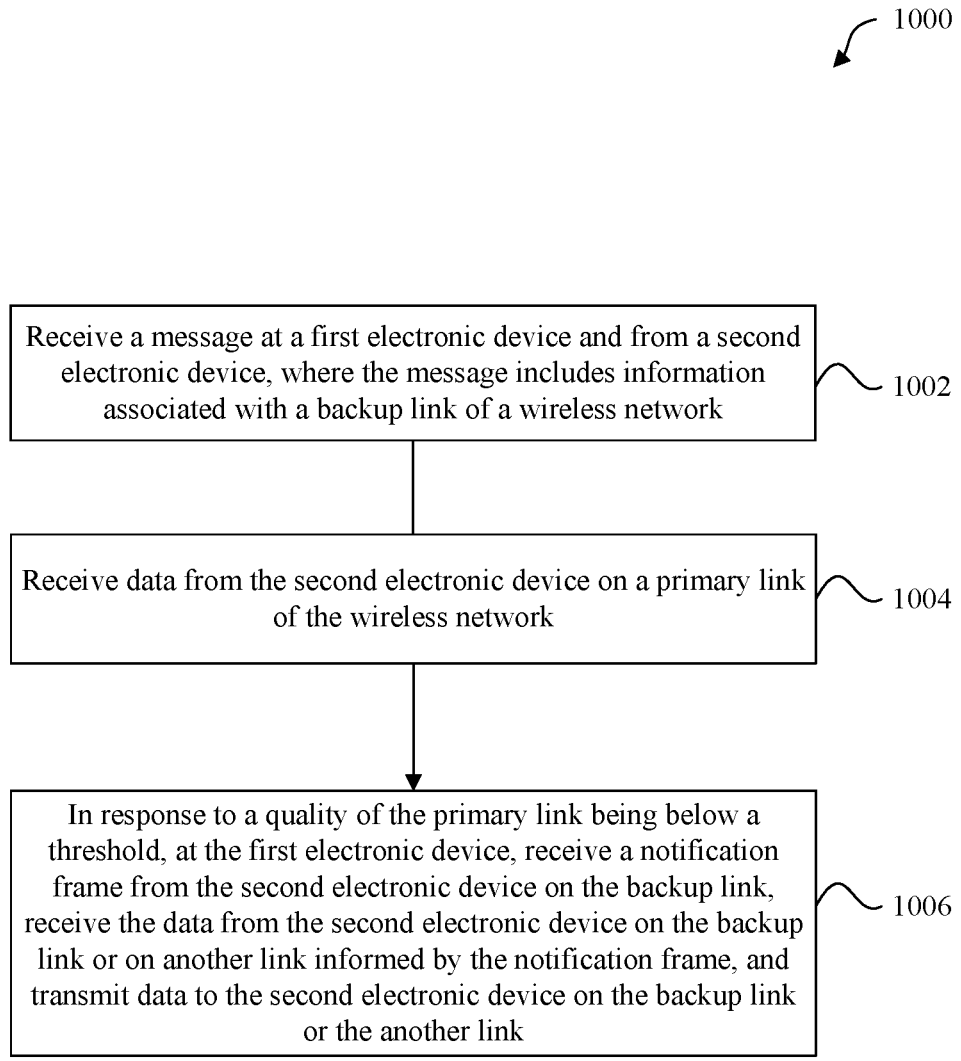
FIG. 10 illustrates an example method for a wireless system supporting and implementing backup link establishment and operation for multi-link wireless communication networks, such as a wireless local area network (WLAN), according to some aspects of the disclosure.

FIG. 10 illustrates an example method 1000 for a wireless system supporting and implementing backup link establishment and operation for multi-link wireless communication networks such as a wireless local area network (WLAN), according to some aspects of the disclosure. As a convenience and not a limitation, FIG. 10 may be described with regard to elements of FIGS. 1-9. Method 1000 may represent the operation of an electronic device (e.g., a non-AP MLD as discussed in this disclosure) implementing backup link establishment and operation for multi-link wireless communication networks. Method 1000 may also be performed by system 200 of FIG. 2 and/or computer system 1200 of FIG. 12. But method 1000 is not limited to the specific aspects depicted in those figures and other systems may be used to perform the method as will be understood by those skilled in the art. It is to be appreciated that not all operations may be needed, and the operations may not be performed in the same order as shown in FIG. 10.

At 1002, a message is received, where the message can include information associated with a backup link of a wireless network. For example, a first electronic device (e.g., a non-AP MLD) can receive the message from a second electronic device (e.g., an AP MLD). In some examples, the message can include message 401 of FIG. 4. According to some aspects, 1002 can be part of the operation 400 of FIG. 4 for establishing the backup link between the non-AP MLD and the AP MLD. Step 1002 can further include transmitting, to the second electronic device (e.g., the AP MLD), a second message (e.g., message 403 of FIG. 4). In some examples, the second message can indicate that the first electronic device (e.g., the non-AP MLD) supports the backup link and the backup link is associated with a receiver (e.g., a receive-only receiver such as a scan radio) of the first electronic device (e.g., the non-AP MLD) or is associated with a transceiver of the first electronic device (e.g., the non-AP MLD) and other capability information relating to the backup link of the first electronic device.

Alternatively, step 1002 can further include transmitting, to the second electronic device (e.g., the AP MLD), a second message (e.g., message 403 of FIG. 4) indicating an alternative preferred backup link. Step 1002 can further include receiving, from the second electronic device (e.g., the AP MLD), a third message (e.g., message 405 of FIG. 4) confirming the updated backup link.

At 1004, the first electronic device (e.g., the non-AP MLD) receives data from the second electronic device (e.g., the AP MLD) on a primary link of the wireless network. In some examples, after the backup link is established between the non-AP MLD and the AP MLD, the non-AP MLD and the AP MLD can communicate using the primary link. For example, the AP MLD and the non-AP MLD can use the primary link to communicate low latency traffic. The data can be part of a data traffic such as, but not limited to, a low latency traffic. According to some examples, the primary link is independent and separate from the backup link.

At 1006, in response to a quality of the primary link being below a threshold, the first electronic device (e.g., the non-AP MLD) receives a notification frame from the second electronic device (e.g., the AP MLD) on the backup link, and additional data frame from the second electronic device on the backup link if the first device uses a transceiver (e.g., the operation in FIG. 5A), or an auxiliary receiver-only radio, which can be turned to a transceiver by moving the radio resource associated the primary link to the auxiliary radio (e.g., the operation illustrated in FIG. 5C), to enable the backup link, where the first and second devices switch the low latency communication to the backup link, or to continue the low latency communication another link informed/indicated by the notification frame.

According to some examples, the first electronic device (e.g., the non-AP MLD) has a first transceiver that is configured to operate at the primary link (e.g., configured to operate on a frequency of the primary link) and has a second transceiver that is configured to operate at the backup link (e.g., configured to operate on a frequency of the backup link). In these examples, receiving the data of the data traffic from the second electronic device (e.g., the AP MLD) on the primary link includes receiving the data using the first transceiver on the primary link. Also, receiving the additional data of the data traffic from the second electronic device (e.g., the AP MLD) on the backup link includes receiving the additional data, using the second transceiver, on the backup link or another link informed/indicated by the notification frame. According to some examples, the first and second transceivers can operate independently and separately from each other.

According to some examples, method 1000 can also include setting a power save schedule of the second transceiver configured to operate at the backup link based on a traffic schedule associated with the schedule of data/data traffic on the primary link and possibly other factors, so that the second device can receive the notification frame and the data/traffic frame from the first device on the backup link during the exchange of the data/traffic on the primary low latency link. Additionally, or alternatively, method 1000 can include setting a power save schedule of the second transceiver configured to operate at the backup link based on a power save schedule of the first transceiver configured to operate at the primary link and possibly other factors so that second device can receive the notification frame and data/traffic frame from the first device on the backup link during the exchange of the data/traffic on the primary low latency link.

According to some examples, the first electronic device (e.g., the non-AP MLD) has a transceiver that is configured to operate at the primary link (e.g., configured to operate on a frequency of the primary link) and has a receiver (e.g., a receive-only auxiliary receiver) configured to scan the backup link (e.g., the operation illustrated in FIG. 5B). In these examples, receiving the data from the second electronic device (e.g., the AP MLD) on the primary link can include receiving the data, using the transceiver, on the primary link. Also, receiving the notification frame from the second electronic device on the backup link can include receiving the notification frame, using the receiver, on the backup link. According to some examples, the notification frame can include at least one of a notification that the quality of the primary link is below the threshold or information associated with a communication link to be used to continue data communication.

According to some examples, when the first device enables the backup link using a scan radio, method 1000 can also include setting a scan schedule of the receiver based on a traffic schedule associated with the data. Additionally, or alternatively, method 1000 can include setting a scan schedule of the receiver based on a power save schedule of the transceiver configured to operate at the primary link.

Figure 11:
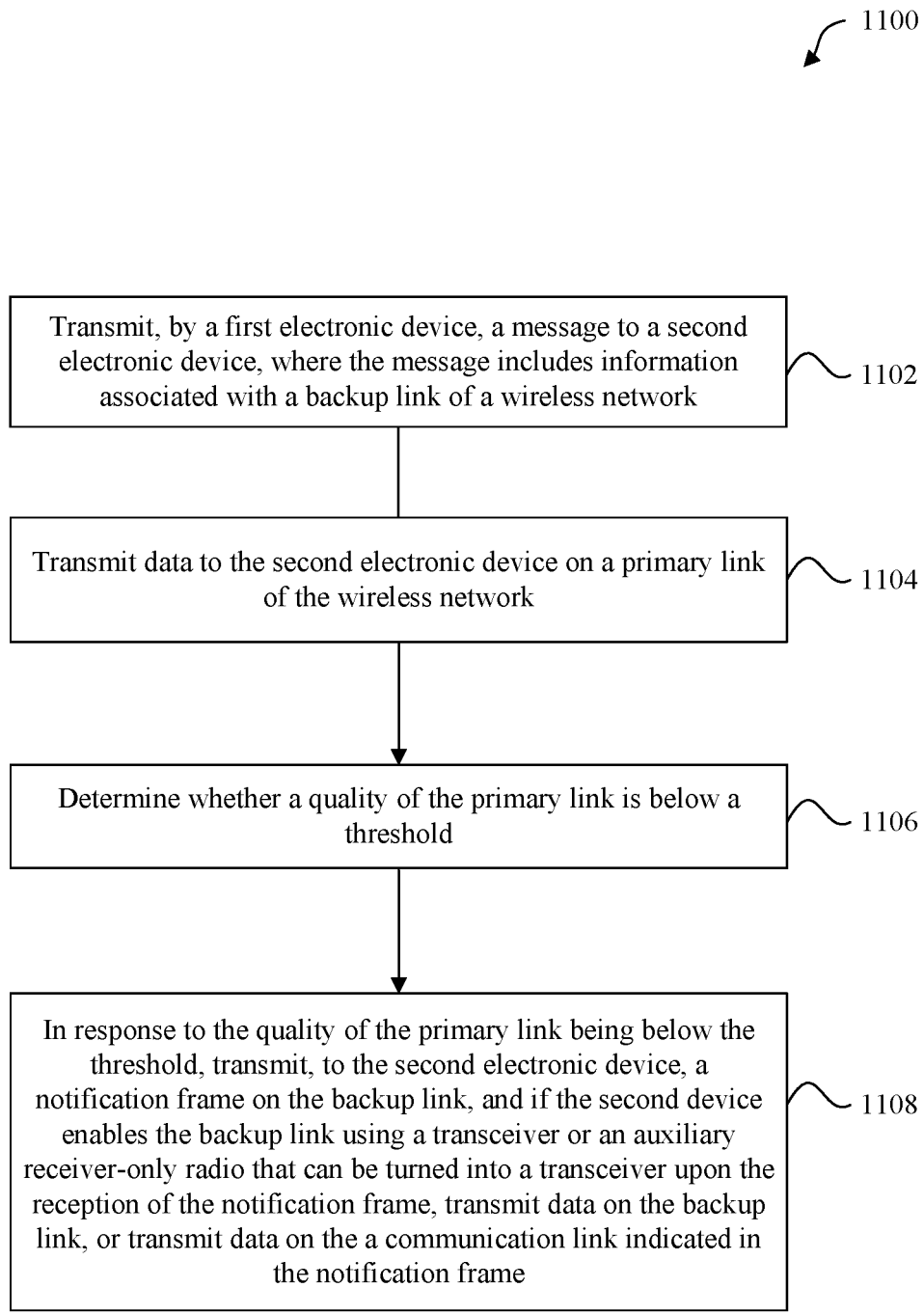
FIG. 11 illustrates an example method for a wireless system supporting and implementing backup link establishment and operation for multi-link wireless communication networks such as a wireless local area network (WLAN), according to some aspects of the disclosure.

FIG. 11 illustrates an example method 1100 for a wireless system supporting and implementing backup link establishment and operation for multi-link wireless communication networks such as a wireless local area network (WLAN), according to some aspects of the disclosure. As a convenience and not a limitation, FIG. 11 may be described with regard to elements of FIGS. 1-9. Method 1100 may represent the operation of an electronic device (e.g., an AP MLD as discussed in this disclosure) implementing backup link establishment and operation for multi-link wireless communication networks. Method 1100 may also be performed by system 200 of FIG. 2 and/or computer system 1200 of FIG. 12. But method 1100 is not limited to the specific aspects depicted in those figures and other systems may be used to perform the method as will be understood by those skilled in the art. It is to be appreciated that not all operations may be needed, and the operations may not be performed in the same order as shown in FIG. 11

At 1102, a message is transmitted, where the message includes information associated with a backup link of a wireless network. For example, a first electronic device (e.g., an AP MLD) transmits the message to a second electronic device (e.g., a non-AP MLD). In some examples, the message can include message 401 of FIG. 4. According to some aspects, 1102 can be part of the operation 400 of FIG. 4 for establishing the backup link between the non-AP MLD and the AP MLD. Step 1102 can further include receiving, from the second electronic device (e.g., the non-AP MLD), a second message (e.g., message 403 of FIG. 4). In some examples, the second message can indicate that the second electronic device (e.g., the non-AP MLD) supports the backup link and the backup link is associated with a receiver (e.g., a receive-only auxiliary receiver such as a scan radio) of the second electronic device (e.g., the non-AP MLD) or is associated with a transceiver of the second electronic device (e.g., the non-AP MLD) and other capability information relating to the backup link of the second electronic device.

Alternatively, step 1102 can further include receiving, from the second electronic device (e.g., the non-AP MLD), a second message (e.g., message 403 of FIG. 4) indicating an alternative preferred backup link. Step 1102 can further include transmitting, to the second electronic device (e.g., the non-AP MLD), a third message (e.g., message 405 of FIG. 4) confirming the updated backup link.

At 1104, the first electronic device (e.g., the AP MLD) transmits data to the second electronic device (e.g., the non-AP MLD) on a primary link of the wireless network. In some examples, after the backup link is established between the non-AP MLD and the AP MLD, the non-AP MLD and the AP MLD can communicate using the primary link. For example, the AP MLD and the non-AP MLD can use the primary link to communicate low latency traffic. The data can be part of a data traffic such as, but not limited to, a low latency traffic. According to some examples, the primary link is independent and separate from the backup link.

At 1106, a determination is made whether the quality of the primary link has deteriorated. For example, the first electronic device (e.g., the AP MLD) can determine whether one or more metrics used to determine the quality of the link are below one or more predetermined thresholds. In some examples, the first electronic device (e.g., the AP MLD) receives information associated with the primary link from the second electronic device (and/or other electronic devices) and determines whether the quality of the primary link is below a threshold.

At 1108, in response to the quality of the primary link being below the threshold, the first electronic device (e.g., the AP MLD) transmits a notification frame to the second electronic device on the backup link, and if the second device (e.g., the non-AP MLD) uses a transceiver to enable the backup link, the first and second devices switch the low latency communication to the backup link, or another link informed by the notification frame, from the primary low latency link.

According to some examples, 1108 can further include determining, in addition to transmitting a notification frame to the second electronic device on the backup link, whether to transmit the data to the second electronic device (e.g., the non-AP MLD) on the backup link. For example, the first electronic device (e.g., the AP MLD) can determine whether the backup link is associated with a transceiver at the second electronic device (e.g., the non-AP MLD) or with a receiver (e.g., a receive-only auxiliary receiver) at the second electronic device (e.g., the non-AP MLD) (e.g., the operation illustrated in FIG. 5A), or a receiver, which can be turned into a transceiver by moving radio resource from the transceiver associated with the primary link to the receiver (e.g., the operation illustrated in FIG. 5C), at the second electronic device. The first electronic device (e.g., the AP MLD) can make the determination based on the information previously transmitted by the second electronic device (e.g., the non-AP MLD) using, for example, message 403 of FIG. 4. If the first electronic device (e.g., the AP MLD) determines that the backup link is associated with a transceiver or a receiver that can be turned into a transceiver at the second electronic device (e.g., the non-AP MLD), the first electronic device (e.g., the AP MLD) elects the backup link as the new link for continued communication and continues the transmission of data (e.g., additional data of the data traffic) on the backup link.

If the first electronic device (e.g., the AP MLD) determines the backup link is associated with a receiver (e.g., a receive-only auxiliary receiver) at the second electronic device (e.g., the non-AP MLD) (e.g., the operation illustrated in FIG. 5B), the first electronic device (e.g., the AP MLD) transmits the notification frame to the second electronic device (e.g., the non-AP MLD) on the backup link. According to some examples, the notification frame can include at least one of a notification that the quality of the primary link is below the threshold or information associated with a communication link (which is not the backup link) to be used for to continue communicating the data. After transmitting the notification frame, the first electronic device (e.g., the AP MLD) can continue transmitting the data on the communication link that was identified in the frame message, according to some examples.

Although some aspects of this disclosure are discussed with respect to low latency traffic and a primary low latency link (e.g., a link used for communicating low latency traffic), the aspects of this disclosure are not limited to these examples and can be applied to other traffics and primary links. Additionally, although some examples are provided with respect to communication between an AP MLD and a non-AP MLD, the of this disclosure are not limited to these examples and can be applied to, for example, peer-to-peer (P2P) communication too.

Figure 12:
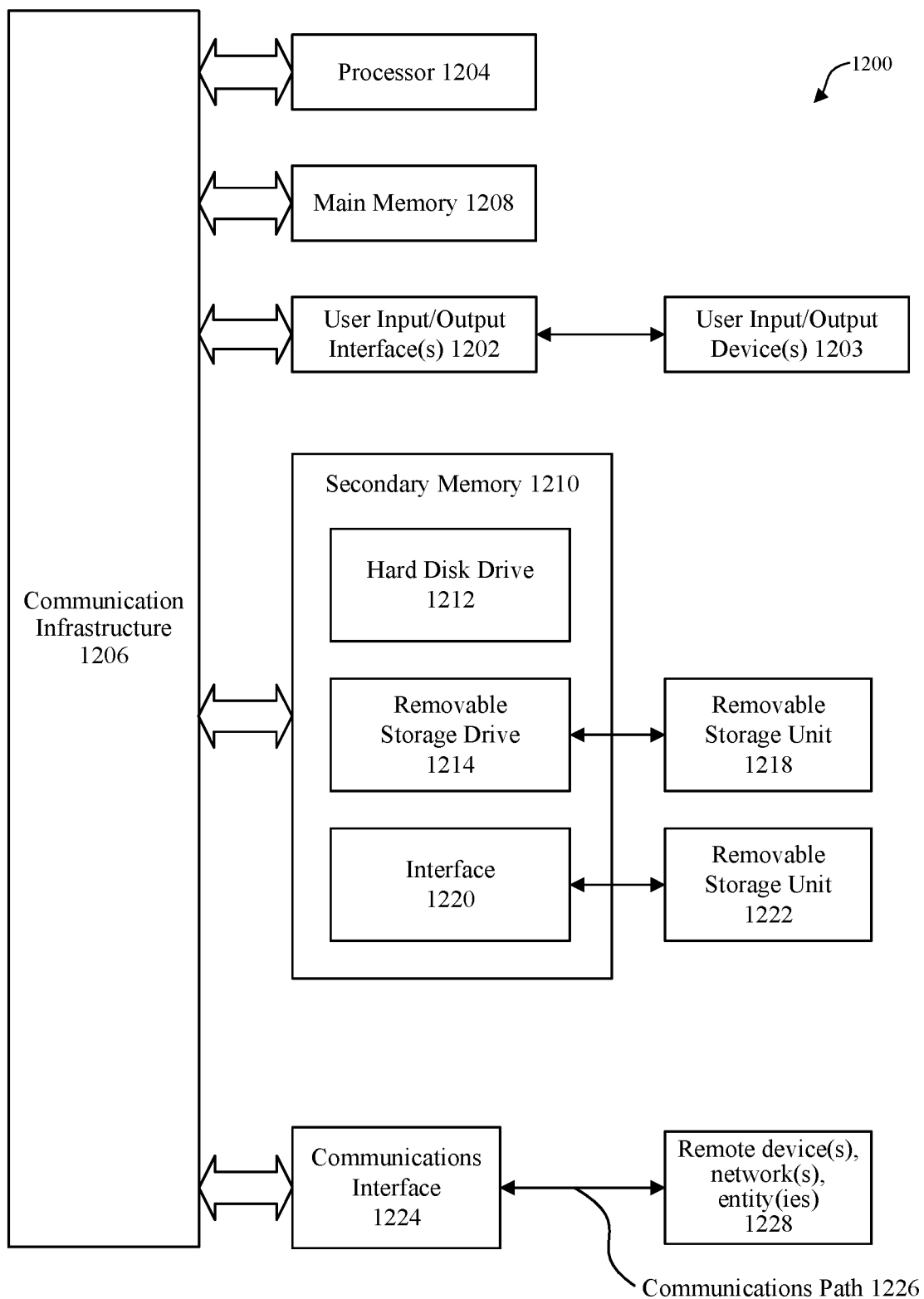
FIG. 12 illustrates an example computer system for implementing some aspects of the disclosure or portion(s) thereof.

Various aspects can be implemented, for example, using one or more computer systems, such as computer system 1200 shown in FIG. 12. Computer system 1200 can be any well-known computer capable of performing the functions described herein such as devices 110, 120 of FIGS. 1A and 1B, or 200 of FIG. 2. Computer system 1200 includes one or more processors (also called central processing units, or CPUs), such as a processor 1204. Processor 1204 is connected to a communication infrastructure 1206 (e.g., a bus.) Computer system 1200 also includes user input/output device(s) 1203, such as monitors, keyboards, pointing devices, etc., that communicate with communication infrastructure 1206 through user input/output interface(s) 1202. Computer system 1200 also includes a main or primary memory 1208, such as random access memory (RAM). Main memory 1208 may include one or more levels of cache. Main memory 1208 has stored therein control logic (e.g., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to some aspects, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1200, main memory 1208, secondary memory 1210 and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 12. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "some aspects," "an example," "some examples" or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
a transceiver configured to communicate over a wireless network; and
a processor communicatively coupled to the transceiver and configured to:
receive, from a second electronic device, a message comprising information associated with a backup link of the wireless network;

in response to receiving the message, transmit, to the second electronic device, a second message indicating that the electronic device supports using multiple links and indicating whether the electronic device supports using the backup link indicated in the message from the second electronic device;

receive, on a primary link of the wireless network, data associated with data traffic from the second electronic device; and in response to a quality of the primary link being below a threshold,
  receive, from the second electronic device, a notification frame on the backup link; and
  receive, from the second electronic device, additional data associated with the data traffic on the backup link or on another link in response to receiving the notification frame.

2. The electronic device of claim 1, wherein the second message further indicates that:

the electronic device supports the backup link;

the backup link is associated with a first receiver of the electronic device, a second transceiver of the electronic device, or a second receiver of the electronic device, wherein the second receiver is configured to be turned into a third transceiver by transitioning a radio resource from the transceiver of the electronic device; and capability information associated with the backup link.

3. The electronic device of claim 1, wherein the second message indicates an alternative backup link and the processor is further configured to:

receive, from the second electronic device, a confirmation message.

4. The electronic device of claim 1, further comprising:
a second transceiver configured to operate on a frequency associated with the backup link,
wherein the processor is further configured to set a power save schedule of the second transceiver based at least on a traffic schedule associated with the data or based at least on a power save schedule of the transceiver.

5. The electronic device of claim 1, further comprising:
a second transceiver configured to operate on a frequency associated with the backup link, wherein the transceiver is configured to operate on a frequency associated with the primary link, wherein:
  the processor is configured to receive the data, on the primary link from the second electronic device, using the transceiver;
  the processor is configured to receive the additional data, on the backup link from the second electronic device, using the second transceiver, and
  the processor is further configured to set a power save schedule of the second transceiver based at least on a traffic schedule associated with the data or based at least on a power save schedule of the transceiver.

6. The electronic device of claim 5, wherein the second transceiver is in an awake state when the transceiver is in the awake state.

7. The electronic device of claim 1, further comprising:
a receiver configured to scan channels in the wireless network over the backup link,
wherein the processor is further configured to set a scan schedule of the receiver based at least on a traffic schedule associated with the data or based at least on a power save schedule of the transceiver.

8. The electronic device of claim 1, further comprising:
a receiver configured to scan channels in the wireless network, wherein the transceiver is configured to operate on a frequency associated with the primary link, wherein:
  the processor is configured to receive the data, on the primary link from the second electronic device, using the transceiver; and
  the processor is configured to receive the notification frame, on the backup link, using the receiver.

9. The electronic device of claim 8, wherein the notification frame comprises at least one of a notification that the quality of the primary link is below the threshold or information associated with the other link to be used for continued data communication.

10. The electronic device of claim 8, wherein the processor is configured to set a scan schedule of the receiver based at least on a traffic schedule associated with the data.

11. The electronic device of claim 10, wherein the receiver is in an awake state when the transceiver is in the awake state.

12. The electronic device of claim 8, wherein the processor is configured to set a scan schedule of the receiver based at least on a power save schedule of the transceiver.

13. The electronic device of claim 1, further comprising:
an auxiliary receiver-only radio configured to operate on a frequency associated with the backup link, wherein the transceiver is configured to operate on a frequency associated with the primary link.

14. The electronic device of claim 13, wherein:
the processor is configured to receive the data on the primary link, from the second electronic device, using the transceiver;
the auxiliary receiver-only radio is in a listening mode prior to the reception of the notification frame on the backup link, from the second electronic device, of the notification frame, and
the processor is configured to transition a radio resource from the transceiver on the primary link to the auxiliary receiver-only radio, upon the reception of the notification frame on the backup link, and to subsequently receive the additional data on the backup link, using the auxiliary receiver-only radio.

15. A method, comprising:
receiving, at a first electronic device, a message from a second electronic device, wherein the message comprises information associated with a backup link of a wireless network;

in response to receiving the message, transmitting, by the first electronic device to the second electronic device, a second message indicating that the first electronic device supports using multiple links and indicating whether the first electronic device supports using the backup link indicated in the message from the second electronic device;

receiving, at the first electronic device and from the second electronic device, data associated with traffic on a primary link of the wireless network; and in response to a quality of the primary link being below a threshold,
  receiving additional data associated with the traffic from the second electronic device on the backup link; or
  receiving a notification frame from the second electronic device on the backup link, wherein the notification frame comprises at least one of a notification that the quality of the primary link is below the threshold or information associated with a communication link to be used for communicating the additional data.

16. The method of claim 15, wherein the first electronic device comprises a first transceiver configured to operate on a frequency associated with the primary link and a second transceiver configured to operate on a frequency associated with the backup link, the method further comprising:
setting a power save schedule of the second transceiver based at least on a traffic schedule associated with the data of the traffic; or
setting a power save schedule of the second transceiver based at least on a power save schedule of the first transceiver.

17. The method of claim 15, further comprising:
transmitting, to the second electronic device, a second message indicating an alternative backup link; and
receiving, from the second electronic device, a confirmation message.

18. The method of claim 15, wherein the first electronic device comprises a transceiver configured to operate on a frequency associated with the primary link and a receiver configured to scan channels in the wireless network over the backup link, and the method further comprising:
setting a scan schedule of the receiver based at least on a traffic schedule associated with the data or based at least on a power save schedule of the transceiver.

19. A non-transitory computer-readable medium storing instructions that, when executed by a processor of a first electronic device, cause the processor to perform operations, the operations comprising:
receiving a message from a second electronic device, wherein the message comprises information associated with a backup link of a wireless network;
in response to receiving the message, transmitting, to the second electronic device, a second message indicating that the first electronic device supports using multiple links and indicating whether the first electronic device supports using the backup link indicated in the message from the second electronic device;
receiving, from the second electronic device, data associated with traffic on a primary link of the wireless network; and
in response to a quality of the primary link being below a threshold,
receiving a notification frame from the second electronic device on the backup link; and
receiving additional data associated with the traffic from the second electronic device on the backup link or on another link in response to receiving the notification frame.

20. The non-transitory computer-readable medium of claim 19, wherein the first electronic device comprises a transceiver configured to operate on a frequency associated with the primary link and a receiver configured to scan channels in the wireless network over the backup link, and the operations further comprising:
setting a scan schedule of the receiver based at least on a traffic schedule associated with the data or based at least on a power save schedule of the transceiver.

* * * * *